United States Patent
Hendry et al.

(10) Patent No.: US 10,298,938 B2
(45) Date of Patent: *May 21, 2019

(54) SAMPLE ENTRY AND OPERATION POINT SIGNALLING IN A LAYERED VIDEO FILE FORMAT

(71) Applicant: QUALCOMM Incorporated, San Diego, CA (US)

(72) Inventors: Fnu Hendry, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,269

(22) Filed: Nov. 7, 2018

(65) Prior Publication Data
US 2019/0075306 A1 Mar. 7, 2019

Related U.S. Application Data

(63) Continuation of application No. 15/019,634, filed on Feb. 9, 2016, now Pat. No. 10,148,969.
(Continued)

(51) Int. Cl.
| | |
|---|---|
| H04N 19/187 | (2014.01) |
| H04N 19/46 | (2014.01) |
| H04N 19/44 | (2014.01) |
| H04N 19/39 | (2014.01) |
| H04N 21/2343 | (2011.01) |
| H04N 21/845 | (2011.01) |
| H04N 21/854 | (2011.01) |

(Continued)

(52) U.S. Cl.
CPC .......... *H04N 19/187* (2014.11); *H04N 19/39* (2014.11); *H04N 19/44* (2014.11); *H04N 19/46* (2014.11); *H04N 19/70* (2014.11); *H04N 21/23439* (2013.01); *H04N 21/8456* (2013.01); *H04N 21/85406* (2013.01); *H04N 19/30* (2014.11); *H04N 19/597* (2014.11)

(58) Field of Classification Search
CPC .................................................. H04N 19/187
See application file for complete search history.

(56) References Cited

U.S. PATENT DOCUMENTS 10,148,969 B2 * 12/2018 Hendry ............... H04N 19/187
2008/0095230 A1    4/2008 Hannuksela et al.
(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
(Continued)

*Primary Examiner* — James M Pontius
(74) *Attorney, Agent, or Firm* — Shumaker & Sieffert, P.A.

(57) ABSTRACT

A video device for processing multi-layer video data includes a data storage medium configured to store the multi-layer video data and one or more processors configured to obtain the multi-layer video data; store the multi-layer video data in a file format; store representation format information for each operation point of the multi-layer video data in an operation points information (oinf) box for the file format; and generate a file of video data formatted according to the file format.

28 Claims, 9 Drawing Sheets

Related U.S. Application Data

(60) Provisional application No. 62/115,075, filed on Feb. 11, 2015.

(51) Int. Cl.
*H04N 19/70* (2014.01)
*H04N 19/597* (2014.01)
*H04N 19/30* (2014.01)

(56) References Cited

U.S. PATENT DOCUMENTS

| | | | |
|---|---|---|---|
| 2010/0250763 A1* | 9/2010 | Bouazizi | H04N 21/234327 709/231 |
| 2012/0013746 A1 | 1/2012 | Chen et al. | |
| 2013/0182755 A1* | 7/2013 | Chen | H04N 19/70 375/240.01 |
| 2013/0287366 A1 | 10/2013 | Wang | |
| 2014/0003487 A1* | 1/2014 | Haque | H04N 19/70 375/240.02 |
| 2014/0003491 A1* | 1/2014 | Chen | H04N 19/597 375/240.02 |
| 2014/0003535 A1* | 1/2014 | Haque | H04N 19/70 375/240.25 |
| 2014/0192151 A1 | 7/2014 | Wang et al. | |
| 2014/0269934 A1* | 9/2014 | Haque | H04N 19/597 375/240.25 |
| 2015/0110167 A1* | 4/2015 | Chen | H04N 19/70 375/240.01 |
| 2016/0105688 A1* | 4/2016 | Hendry | H04N 19/44 375/240.25 |
| 2016/0373771 A1* | 12/2016 | Hendry | H04N 19/70 |
| 2017/0171282 A1 | 6/2017 | Denoual et al. | |
| 2017/0289556 A1* | 10/2017 | Hendry | H04N 19/119 |
| 2018/0184098 A1* | 6/2018 | Denoual | H04N 21/23424 |
| 2018/0199070 A1* | 7/2018 | Wang | H04N 21/23614 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCWC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

"Text of ISO/IEC 14496-15: 2010 PDAM 2 Carriage of High efficiency Video Coding (HEVC)", MPEG Meeting; Apr. 30-May 4, 2012; Geneva; (Motion Picture Expert Group or ISO/IEC JTC1/SC29/WG11), No. N12647, May 8, 2012, 17 pp.

Hendry et al., "On HEVC and L-HEVC File Formats," MPEG Meeting; Feb. 6-20, 2015; Geneva; (Motion Picture Expert Group or ISO/IEC JTC1/SC29/WG11), No. m35923, Feb. 11, 2015, 9 pp.

Samuelsson, et al., "HEVC File Format Parallelism Indication," MPEG Meeting; Oct. 15-19, 2012; Shanghai; (Motion Picture Expert Group or ISO/IEC JTC1/SC29/WG11) No. m26877, Oct. 18, 2012, 3 pp.

ITU-T H.223, Series H: Audiovisual and Multimedia Systems, Infrastructure of audiovisual services—Transmission multiplexing and synchronization, Multiplexing protocol for low bit rate multimedia communication, The International Telecommunication Union. Jul. 2001, 74 pp.

Wang, et al., "High Efficiency Video Coding (HEVC) Defect Report," JCT-VC Meeting; Jul. 25-Aug. 2, 2013; (Motion Picture Expert Group or ISO/IEC JTC1/SC29/WG11); document No. JCTVC-N1003_v1; Sep. 27, 2013; 312 pp.

Tech, et al., "MV-HEVC Draft Text 5," JCT-3V Meeting; Jul. 27-Aug. 2, 2013; (Joint Collaborative Team on Video Coding of ISO/IEC JTC1/SC29/WG11 and ITU-T SG.16); document No. JCT3V-E1004_v6, Aug. 7, 2013, 65 pp.

Chen, et al., "High efficiency video coding (HEVC) scalable extension draft 3," JCT-VC Meeting; Jul. 25-Aug. 2, 2013; (Joint Collaborative Team on Video Coding of ISO/IEC JTC1/SC29/WG11 and ITU-T SG.16); document No. JCTVC-N1008_v3, Sep. 16, 2013, 68 pp.

Flynn, et al., "High Efficiency Video Coding (HEVC) Range Extensions text specification: Draft 4," JCT-VC Meeting; Apr. 18-26, 2013; (Joint Collaborative Team on Video Coding of ISO/IEC JTC1/SC29/WG11 and ITU-T SG.16); document No. JCTVC-N1005_v1, Aug. 8, 2013, 334 pp.

Tech, et al., "3D-HEVC Draft Text 1," JCT-VC Meeting; Jul. 27-Aug. 2, 2013; (Joint Collaborative Team on Video Coding of ISO/IEC JTC1/SC29/WG11 and ITU-T SG.16); document No. JCT3V-E1001_v3, Sep. 11, 2013, 89 pp.

International Standard ISO/IEC 14496-12, Information Technology—Coding of audio-visual objects—Part 12: ISO base media file format, Third Edition, Oct. 15, 2008, 120 pp.

"Text of ISO/IEC FDIS 14496-15:2010 3rd edition Carriage of NAL unit structured video in the ISO BMFF", 104, MPEG Meeting; Apr. 22-26, 2013; Incheon; (Motion Picture Expert Group or ISO/IEC JTC1/SC29/WG11), No. N13478, Jun. 8, 2013, 118 pp.

"International Standard ISO/IEC 14496-14, Information Technology—Coding of audio-visual objects—Part 14: MP4 file format," First Edition, Nov. 15, 2003, 18 pp.

3GPP TS 26.244 V9.1.0, 3rd Generation Partnership Project; Technical Specification Group Services and System Aspects; Transpar-

(56) References Cited

OTHER PUBLICATIONS ent end-to-end packet switched streaming service (PSS); 3GPP file format (3GP), (Release 12), Dec. 2013, 61 pp.
Tech, et al., "MV-HEVC Draft Text 3 (ISO/IEC 23008-2:201x/PDAM2)," JCT-3V Meeting; Jan. 17-23, 2013; (Joint Collaborative Team on Video Coding of ISO/IEC JTC1/SC29/WG11 and ITU-T SG.16); document No. JCT3V-C1004_d3, Mar. 27, 2013; 34 pp.
International Search Report and Written Opinion of International Application No. PCT/US2016/017280, dated May 3, 2016, 15 pp.
Response to Written Opinion dated May 3, 2016, from International Application No. PCT/US2016/017280, dated Jul. 21, 2016, 5 pp.
Second Written Opinion from International Application No. PCT/US2016/017280, dated Jan. 16, 2017, 8 pp.
International Preliminary Report on Patentability of International Application No. PCT/US2016/017280, dated Apr. 13, 2017, 9 pp.
Prosecution History for U.S. Appl. No. 15/019,634 dated from Feb. 9, 2016 through Nov. 5, 2018 (218 pgs.).

\* cited by examiner

SAMPLE ENTRY AND OPERATION POINT SIGNALLING IN A LAYERED VIDEO FILE FORMAT

This application is a continuation of U.S. application Ser. No. 15/019,634, filed Feb. 9, 2016, which claims the benefit of U.S. Provisional Application No. 62/115,075, filed Feb. 11, 2015, the entire content of each being incorporated herein by reference

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure relates to storing of video content in a file. In some examples, the techniques of the disclosure are based on the International Standards Organization (ISO) base media file format (ISOBMFF). Some examples of this disclosure relate to methods for storing of video streams containing multiple coded layers, where each layer may be a scalable layer, a texture view, a depth view, etc., and the methods may apply to storage of Multi-View High Efficiency Video Coding (MV-HEVC), Scalable HEVC (SHVC), 3-dimensional HEVC (3D-HEVC), and other types of video data.

In one example, a method of processing multi-layer video data includes obtaining the multi-layer video data; storing the multi-layer video data in a file format; storing representation format information for each operation point of the multi-layer video data in an operation points information (oinf) box for the file format; and generating a file of video data formatted according to the file format.

In another example, a method of processing multi-layer video data includes obtaining a file of multi-layer video data formatted according to a file format; for the file format, determining representation format information for each operation point of the multi-layer video data in an operation points information (oinf) box for the file format; and decoding the multi-layer video data based on the determined representation format information.

In another example, a video device for processing multi-layer video data includes a data storage medium configured to store the multi-layer video data and one or more processors configured to: obtain the multi-layer video data; store the multi-layer video data in a file format; store representation format information for each operation point of the multi-layer video data in an operation points information (oinf) box for the file format; and generate a file of video data formatted according to the file format.

In another example, a video device for processing multi-layer video data includes a data storage medium configured to store the multi-layer video data and one or more processors configured to obtain a file of multi-layer video data formatted according to a file format; for the file format, determine representation format information for each operation point of the multi-layer video data in an operation points information (oinf) box for the file format; and decode the multi-layer video data based on the determined representation format information.

In another example, a video device for processing multi-layer video data includes means for obtaining the multi-layer video data; means for storing the multi-layer video data in a file format; means for storing representation format information for each operation point of the multi-layer video data in an operation points information (oinf) box for the file format; and means for generating a file of video data formatted according to the file format.

In another example, a computer-readable storage medium stores instructions that when executed cause one or more processors to obtain multi-layer video data; store the multi-layer video data in a file format; store representation format information for each operation point of the multi-layer video data in an operation points information (oinf) box for the file format; and generate a file of video data formatted according to the file format.

The details of one or more examples of the disclosure are set forth in the accompanying drawings and the description below. Other features, objects, and advantages will be apparent from the description, drawings, and claims.

DETAILED DESCRIPTION

The ISO base media file format (ISOBMFF) is a file format for storing media data. The ISOBMFF is extendable to support the storage of video data conforming to particular video coding standards. For example, the ISOBMFF has previously been extended to support the storage of video data conforming to the H.264/AVC and High Efficiency Video Coding (HEVC) video coding standards. Furthermore, the ISOBMFF has previously been extended to support the storage of video data conforming to the multi-view coding (MVC) and scalable video coding (SVC) extensions of H.264/AVC. MV-HEVC, 3D-HEVC, and SHVC are extensions of the HEVC video coding standard that support multi-layer video data. The features added to the ISOBMFF for storage of video data conforming to the MVC and SVC extensions of H.264/AVC are not sufficient for effective storage of video data conforming to MV-HEVC, 3D-HEVC, and SHVC. In other words, various problems may arise if one were to attempt to use the extension of the ISOBMFF for storage of video data conforming to the MVC and SVC extensions of H.264/AVC for storage of video data conforming to MV-HEVC, 3D-HEVC, and SHVC.

For example, unlike a bitstream that conforms to the MVC or SVC extensions of H.264/AVC, a bitstream that conforms to MV-HEVC, 3D-HEVC, or SHVC may include access units that contain Intra Random Access Point (IRAP) pictures and non-IRAP pictures. An access unit containing IRAP pictures and non-IRAP pictures may be used for random access in MV-HEVC, 3D-HEVC, and SHVC. However, the ISOBMFF and existing extensions thereof do not provide a way of identifying such access units. This may hinder the ability of a computing device to perform random access, layer switching, and other such functions associated with multi-layer video data.

While much of the description of the techniques of this disclosure describes MV-HEVC, 3D-HEVC, and SHVC, the reader will appreciate that the techniques of this disclosure may be applicable to other video coding standards and/or extensions thereof.

As will be explained in greater detail below, a file conforming to the HEVC file format may include a series of objects, called boxes. A box may be an object-oriented building block defined by a unique type identifier and length. This disclosure describes techniques related to generating files according to a file format and, more particularly, describes techniques for locating certain types of information in certain boxes to potentially improve a playback device's ability to process files that include multiple operation points.

While much of the description of the techniques of this disclosure describes MV-HEVC, 3D-HEVC, and SHVC, the reader will appreciate that the techniques of this disclosure may be applicable to other video coding standards and/or extensions thereof.

Figure 1:
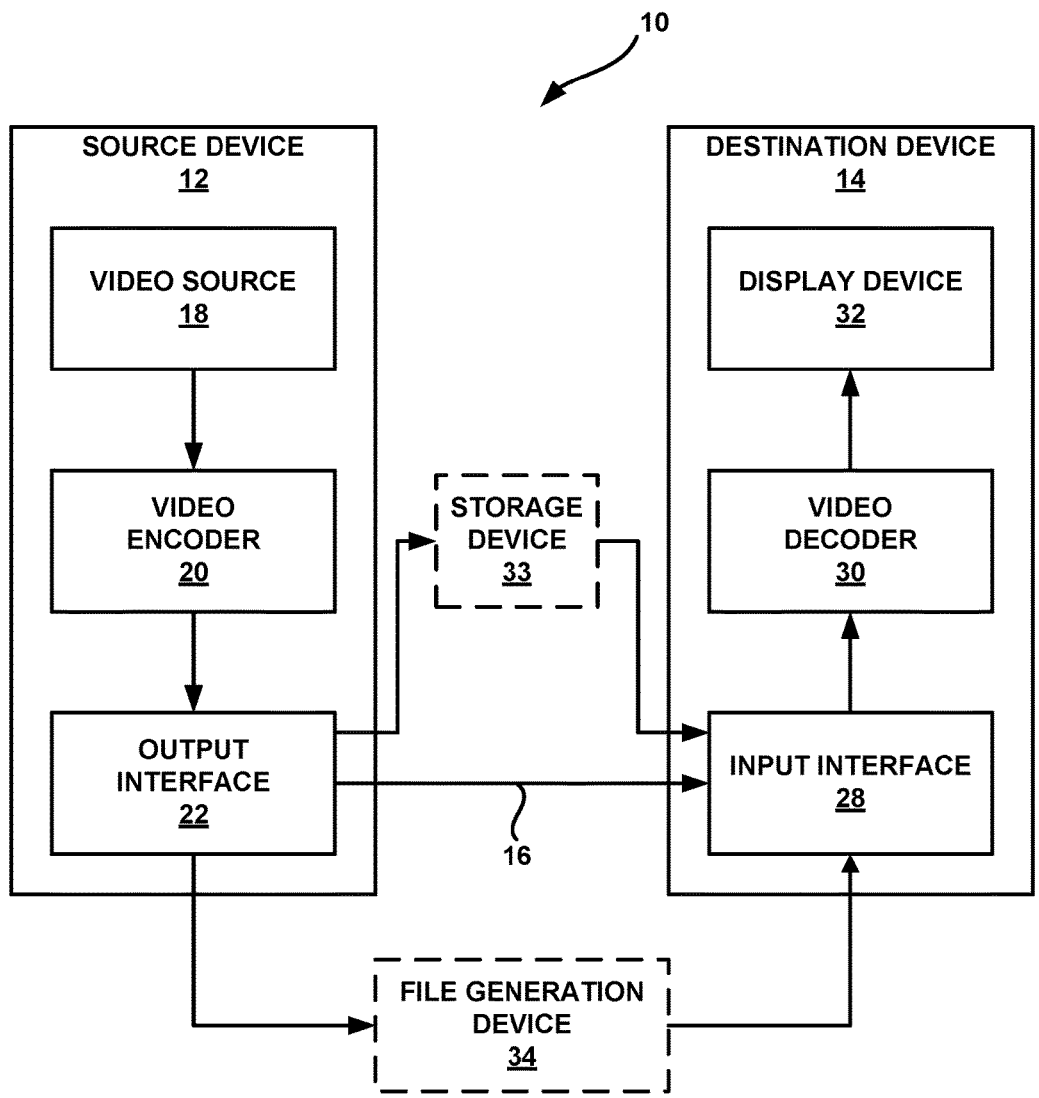
FIG. 1 is a block diagram illustrating an example video encoding and decoding system that may use the techniques described in this disclosure.

FIG. 1 is a block diagram illustrating an example video encoding and decoding system 10 that may use the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication. Source device 12 and destination device 14 may be considered video devices.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. However, the techniques described in this disclosure may be applicable to video coding in general, and may be applied to wireless and/or wired applications.

Video encoder 20 may encode the captured, pre-captured, or computer-generated video. Source device 12 may transmit the encoded video data directly to destination device 14 via output interface 22 of source device 12. The encoded video data may also (or alternatively) be stored onto storage device 33 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 33, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Display device 32 may be integrated with, or may be external to, destination device 14. In some examples, destination device 14 may include an integrated display device and may also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, output interface 22 may output encoded data to a storage device 33. Similarly, input interface 28 may access encoded data storage device 33. Storage device 33 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 33 may correspond to a file server or another intermediate storage device that may hold the encoded video generated by source device 12. Destination device 14 may access stored video data from storage device 33 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 33 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

Furthermore, in the example of FIG. 1, video coding system 10 may include a file generation device 34. File generation device 34 may receive encoded video data generated by source device 12 and generate a file that includes the encoded video data. Destination device 14 may receive, either directly or via storage device 33, the file generated by file generation device 34. In various examples, file generation device 34 may include various types of computing devices. For instance, file generation device 34 may comprise a Media Aware Network Element (MANE), a server computing device, a personal computing device, a special-purpose computing device, a commercial computing device, or another type of computing device. In some examples, file generation device 34 is part of a content delivery network. File generation device 34 may receive the encoded video data from source device 12 via a channel such as link 16. Furthermore, destination device 14 may receive the file from file generation device 34 via a channel such as link 16.

In some configurations, file generation device 34 may be a separate video device from source device 12 and destination device 14, while in other configurations, file generation device 34 may be implemented as a component of source device 12 or destination device 14. In implementations where file generation device 34 is a component of source device 12 or destination device 14, then file generation device 34 may share some of the same resources, such as memories, processors, and other hardware, utilized by video encoder 20 and video decoder 30. In implementations where file generation device 34 is a separate device, then file generation device may include its own memory, processors, and other hardware units.

In other examples, source device 12 or another computing device may generate a file that includes the encoded video data. However, for ease of explanation, this disclosure describes file generation device 34 as generating the file. Nevertheless, it should be understood that such descriptions are applicable to computing devices in general.

Video encoder 20 and video decoder 30 may operate according to a video compression standard, such as the High Efficiency Video Coding (HEVC) standard or an extension thereof. The HEVC standard may also be referred to as ISO/IEC 23008-2. Recently, the design of HEVC has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/14_Vienna/wg11/JCTVC-N1003-v1.zip. The multiview extension to HEVC, namely MV-HEVC, is also being developed by the JCT-3V. A recent Working Draft (WD) of MV-HEVC, titled "MV-HEVC Draft Text 5" and referred to as MV-HEVC WD5 hereinafter, is available from http://phenix.in-sudparis.eu/jct2/doc_end_user/documents/5_Vienna/wg11/JCT3V-E1004-v6.zip. The scalable extension to HEVC, named SHVC, is also being developed by the JCT-VC. A recent Working Draft (WD) of SHVC, titled "High efficiency video coding (HEVC) scalable extension draft 3" and referred to as SHVC WD3 hereinafter, is available from http://phenix.it-sudparis.eu/jct/doc_end_user/documents/14_Vienna/wg11/JCTVC-N1008-v3.zip. A recent working draft (WD) of the range extension of HEVC, is available from available from http://phenix.int-evey.fr/jct/doc_end_user/documents/14_Vienna/wg11/JCTVC-N1005-v3.zip. A recent working draft (WD) of the 3D extension of HEVC, namely 3D-HEVC, titled "3D-HEVC Draft Text 1" is available from http://phenix.int-evry.fr/jct2/doc_end_user/documents/5_Vienna/wg11/JCT3V-E1001-v3.zip. Video encoder 20 and video decoder 30 may operate according to one or more of these standards.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The JCT-VC developed the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264/AVC provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Treeblocks may also be referred to as Coding Tree Units (CTUs). A treeblock has a similar purpose as a macroblock of the H.264/AVC standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node (i.e., coding block) of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may use a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in variable length coding (VLC) may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may output a bitstream that includes a sequence of bits that forms a representation of coded pictures and associated data. The term "bitstream" may be a collective term used to refer to either a Network Abstraction Layer (NAL) unit stream (e.g., a sequence of NAL units) or a byte stream (e.g., an encapsulation of a NAL unit stream containing start code prefixes and NAL units as specified by Annex B of the HEVC standard). A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate an RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a slice segment, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units. NAL units that contain parameter sets (e.g., VPSs, SPSs, PPSs, etc.) may be referred to as parameter set NAL units.

This disclosure may refer to a NAL unit that encapsulates an RBSP for a segment slice as a coded slice NAL unit. As defined in the HEVC WD, a slice segment is an integer number of CTUs ordered consecutively in tile scan and contained in a single NAL unit. In contrast, in the HEVC WD, a slice may be an integer number of CTUs contained in one independent slice segment and all subsequent dependent slice segments (if any) that precede the next independent slice segment (if any) within the same access unit. An independent slice segment is a slice segment for which values of the syntax elements of the slice segment header are not inferred from the values for a preceding slice segment. A dependent slice segment is a slice segment for which the values of some syntax elements of the slice segment header are inferred from the values for the preceding independent slice segment in decoding order. The RBSP of a coded slice NAL unit may include a slice segment header and slice data. A slice segment header is a part of a coded slice segment containing the data elements pertaining to the first or all CTUs represented in the slice segment. A slice header is a slice segment header of the independent slice segment that is a current slice segment or the most recent independent slice segment that precedes a current dependent slice segment in decoding order.

A VPS is a syntax structure comprising syntax elements that apply to zero or more entire coded video sequences (CVSs). An SPS is a syntax structure containing syntax elements that apply to zero or more entire CVSs. An SPS may include a syntax element that identifies a VPS that is active when the SPS is active. Thus, the syntax elements of a VPS may be more generally applicable than the syntax elements of a SPS.

A parameter set (e.g., a VPS, SPS, PPS, etc.) may contain an identification that is referenced, directly or indirectly, from a slice header of a slice. The referencing process is known as "activation." Thus, when video decoder 30 is decoding a particular slice, a parameter set referenced, directly or indirectly, by a syntax element in a slice header of the particular slice is said to be "activated." Depending on the parameter set type, the activation may occur on a per picture basis or a per sequence basis. For example, a slice header of a slice may include a syntax element that identifies a PPS. Thus, when a video coder codes the slice, the PPS may be activated. Furthermore, the PPS may include a syntax element that identifies a SPS. Thus, when a PPS that identifies the SPS is activated, the SPS may be activated. The SPS may include a syntax element that identifies a VPS. Thus, when a SPS that identifies the VPS is activated, the VPS is activated.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In the HEVC WD, a CVS may start from an Instantaneous Decoding Refresh (IDR) picture, or a broken link access (BLA) picture, or a clean random access (CRA) picture that is the first picture in the bitstream, including all subsequent pictures that are not IDR or BLA pictures. An IDR picture contains only I slices (i.e., slices in which only intra prediction is used). An IDR picture may be the first picture in the bitstream in decoding order, or may appear later in the bitstream. Each IDR picture is the first picture of a CVS in decoding order. In the HEVC WD, an IDR picture may be an intra random access point (IRAP) picture for which each VCL NAL unit has a nal_unit_type equal to IDR_W_RADL or IDR_N_LP.

IDR pictures may be used for random access. However, pictures following an IDR picture in decoding order cannot use pictures decoded prior to the IDR picture as reference. Accordingly, bitstreams relying on IDR pictures for random access can have significantly lower coding efficiency than bitstreams that use additional types of random access pictures. In at least some examples, an IDR access unit is an access unit that contains an IDR picture.

The concept of CRA pictures was introduced in HEVC to allow pictures that follow a CRA picture in decoding order, but precede the CRA picture in output order, to use pictures decoded before the CRA picture for reference. Pictures that follow a CRA picture in decoding order, but precede the CRA picture in output order, are referred to as leading pictures associated with the CRA picture (or leading pictures of the CRA picture). That is, to improve coding efficiency, the concept of CRA pictures was introduced in HEVC to allow pictures that follow a CRA picture in decoding order but precede the CRA picture in output order to use pictures decoded before the CRA picture for reference. A CRA access unit is an access unit in which the coded picture is a CRA picture. In the HEVC WD, a CRA picture is an intra random access picture for which each VCL NAL unit has a nal_unit_type equal to CRA_NUT.

The leading pictures of a CRA picture are correctly decodable if the decoding starts from an IDR picture or a CRA picture occurring before the CRA picture in decoding order. However, the leading pictures of a CRA picture may be non-decodable when random access from the CRA picture occurs. Hence, a video decoder typically decodes the leading pictures of a CRA picture during random access decoding. To prevent error propagation from reference pictures that may not be available depending on where the decoding starts, no picture that follows a CRA picture both in decoding order and output order may use any picture that precedes the CRA picture either in decoding order or output order (which includes the leading pictures) for reference.

The concept of a BLA picture was introduced in HEVC after the introduction of CRA pictures and is based on the concept of CRA pictures. A BLA picture typically originates from bitstream splicing at the position of a CRA picture, and in the spliced bitstream, the splicing point CRA picture is changed to a BLA picture. Thus, BLA pictures may be CRA pictures at the original bitstreams and a CRA picture is changed to be a BLA picture by the bitstream splicer after bitstream splicing at the location of the CRA picture. In some instances, an access unit that contains a RAP picture may be referred to herein as a RAP access unit. A BLA access unit is an access unit that contains a BLA picture. In the HEVC WD, a BLA picture may be an intra random access picture for which each VCL NAL unit has nal_unit_type equal to BLA_W_LP, BLA_W_RADL, or BLA_N_LP.

In general, an IRAP picture contains only I slices, and may be a BLA picture, a CRA picture, or an IDR picture. For instance, the HEVC WD indicates that an IRAP picture may be a coded picture for which each VCL NAL unit has nal_unit_type in the range of BLA_W_LP to RSV_I-RAP_VCL23, inclusive. Furthermore, the HEVC WD indicates that the first picture in the bitstream in decoding order must be an IRAP picture. Table 7-1 of HEVC WD shows the NAL unit type codes and NAL unit type classes. Table 7-1 of HEVC WD is reproduced below.

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | TRAIL_N | Coded slice segment of a non-TSA, non-STSA trailing picture slice_segment_layer_rbsp( ) | VCL |
| 1 | TRAIL_R | | |
| 2 | TSA_N | Coded slice segment of a TSA picture slice_segment_layer_rbsp( ) | VCL |
| 3 | TSA_R | | |

TABLE 7-1-continued

NAL unit type codes and NAL unit type classes

| nal_unit_type | Name of nal_unit_type | Content of NAL unit and RBSP syntax structure | NAL unit type class |
|---|---|---|---|
| 4 | STSA_N | Coded slice segment of an STSA picture slice_segment_layer_rbsp( ) | VCL |
| 5 | STSA_R | | |
| 6 | RADL_N | Coded slice segment of a RADL picture slice_segment_layer_rbsp( ) | VCL |
| 7 | RADL_R | | |
| 8 | RASL_N | Coded slice segment of a RASL picture slice_segment_layer_rbsp( ) | VCL |
| 9 | RASL_R | | |
| 10 | RSV_VCL_N10 | Reserved non-IRAP sub-layer non-reference VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a BLA picture slice_segment_layer_rbsp( ) | VCL |
| 17 | BLA_W_RADL | | |
| 18 | BLA_N_LP | | |
| 19 | IDR_W_RADL | Coded slice segment of an IDR picture slice_segment_layer_rbsp( ) | VCL |
| 20 | IDR_N_LP | | |
| 21 | CRA_NUT | Coded slice segment of a CRA picture slice_segment_layer_rbsp( ) | VCL |
| 22 | RSV_IRAP_VCL22 | Reserved IRAP VCL NAL unit types | VCL |
| 23 | RSV_IRAP_VCL23 | | |
| 24 ... 31 | RSV_VCL24 ... RSV_VCL31 | Reserved non-IRAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | |
| 41 ... 47 | RSV_NVCL41 ... RSV_NVCL47 | Reserved | non-VCL |
| 48 ... 63 | UNSPEC48 ... UNSPEC63 | Unspecified | non-VCL |

One difference between BLA pictures and CRA pictures is as follows. For a CRA picture, the associated leading pictures are correctly decodable if the decoding starts from a RAP picture before the CRA picture in decoding order. However, the leading pictures associated with a CRA picture may not be correctly decodable when random access from the CRA picture occurs (i.e., when decoding starts from the CRA picture, or in other words, when the CRA picture is the first picture in the bitstream). In contrast, there may be no scenario where the leading pictures associated with a BLA picture are decodable, even when decoding starts from a RAP picture before the BLA picture in decoding order.

Some of the leading pictures associated with a particular CRA picture or a particular BLA picture may be correctly decodable even when the particular CRA picture or the particular BLA picture is the first picture in a bitstream. These leading pictures may be referred to as decodable leading pictures (DLPs) or Random Access Decodable Leading (RADL) pictures. In the HEVC WD, a RADL picture may be a coded picture for which each VCL NAL unit has a nal_unit_type equal to RADL_R or RADL_N. Furthermore, the HEVC WD indicates that all RADL pictures are leading pictures and that RADL pictures are not used as reference pictures for the decoding process of trailing pictures of the same associated IRAP picture. When present, all RADL pictures precede, in decoding order, all trailing pictures of the same associated IRAP picture. The HEVC WD indicates that a RADL access unit may be an access unit in which the coded picture is a RADL picture. A trailing picture may be a picture that follows the associated IRAP picture (i.e., the previous IRAP picture in decoding order) in output order.

Other leading pictures may be referred to as non-decodable leading pictures (NLPs) or Random Access Skipped Leading (RASL) pictures. In the HEVC WD, a RASL picture may be a coded picture for which each VCL NAL unit has a nal_unit_type equal to RASL_R or RASL_N. All RASL pictures are leading pictures of an associated BLA or CRA picture.

Provided that necessary parameter sets are available when they need to be activated, an IRAP picture and all subsequent non-RASL pictures in decoding order can be correctly decoded without performing the decoding process of any pictures that precede the IRAP picture in decoding order. There may be pictures in a bitstream that contain only I slices that are not IRAP pictures.

In multi-view coding, there may be multiple views of the same scene from different viewpoints. The term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence or set of view components associated with the same view identifier. A view component may contain a texture view component and a depth view component. In this disclosure, a "view" may refer to a set or sequence of one or more view components associated with the same view identifier.

A texture view component (i.e., a texture picture) may be a coded representation of the texture of a view in a single access unit. A texture view may be a sequence of texture view components associated with an identical value of a view order index. A view order index of a view may indicate a camera position of the view relative to other views. A depth view component (i.e., a depth picture) may be a coded representation of the depth of a view in a single access unit. A depth view may be a set or sequence of one or more depth view components associated with an identical value of view order index.

In MV-HEVC, 3D-HEVC and SHVC, a video encoder may generate a bitstream that comprises a series of NAL units. Different NAL units of the bitstream may be associated with different layers of the bitstream. A layer may be defined as a set of VCL NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance. In some examples of 3D video coding, a layer may contain either all coded depth pictures of a specific view or coded texture pictures of a specific view. In other examples of 3D video coding, a layer may contain both texture view components and depth view components of a specific view. Similarly, in the context of scalable video coding, a layer typically corresponds to coded pictures having video characteristics different from coded pictures in other layers. Such video characteristics typically include spatial resolution and quality level (e.g., Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in an enhancement layer. In general, NAL units may only encapsulate data of a single layer. Thus, NAL units encapsulating data of the highest remaining layer of the bitstream may be removed from the bitstream without affecting the decodability of data in the remaining layers of the bitstream. In multi-view coding and 3D-HEVC, higher layers may include additional view components. In SHVC, higher layers may include signal to noise ratio (SNR) enhancement data, spatial enhancement data, and/or temporal enhancement data. In MV-HEVC, 3D-HEVC and SHVC, a layer may be referred to as a "base layer" if a video decoder can decode pictures in the layer without reference to data of any other layer. The base layer may conform to the HEVC base specification (e.g., HEVC WD).

In SVC, layers other than the base layer may be referred to as "enhancement layers" and may provide information that enhances the visual quality of video data decoded from the bitstream. SVC can enhance spatial resolution, signal-to-noise ratio (i.e., quality) or temporal rate. In scalable video coding (e.g., SHVC), a "layer representation" may be a coded representation of a spatial layer in a single access unit. For ease of explanation, this disclosure may refer to view components and/or layer representations as "view components/layer representations" or simply "pictures."

To implement the layers in HEVC, headers of NAL units include a nuh_layer_id syntax element, which was previously referred to as the nuh_reserved_zero_6 bits syntax element in various working drafts that preceded the final HEVC standard. In the base HEVC standard, the nuh_layer_id syntax element is limited to a value of 0. However, in MV-HEVC, 3D-HEVC, and SVC, the nuh_layer_id syntax element may be greater than 0 to specify an identifier of a layer. NAL units of a bitstream that have nuh_layer_id syntax elements that specify different values belong to different layers of the bitstream.

In some examples, the nuh_layer_id syntax element of a NAL unit is equal to 0 if the NAL unit relates to a base layer in multi-view coding (e.g., MV-HEVC), 3DV coding (e.g. 3D-HEVC), or scalable video coding (e.g., SHVC). Data in a base layer of a bitstream may be decoded without reference to data in any other layer of the bitstream. If a NAL unit does not relate to a base layer in multi-view coding, 3DV, or scalable video coding, the nuh_layer_id syntax element of the NAL unit may have a non-zero value.

Furthermore, some view components/layer representations within a layer may be decoded without reference to other view components/layer representations within the same layer. Thus, NAL units encapsulating data of certain view components/layer representations of a layer may be removed from the bitstream without affecting the decodability of other view components/layer representations in the layer. Removing NAL units encapsulating data of such view components/layer representations may reduce the frame rate of the bitstream. A subset of view components/layer representations within a layer that may be decoded without reference to other view components/layer representations within the layer may be referred to herein as a "sub-layer" or a "temporal sub-layer."

NAL units may include temporal_id syntax elements that specify temporal identifiers (i.e., TemporalIds) of the NAL units. The temporal identifier of a NAL unit identifies a sub-layer to which the NAL unit belongs. Thus, each sub-layer of a bitstream may have a different temporal identifier. In general, if the temporal identifier of a first NAL unit of a layer is less than the temporal identifier of a second NAL unit of the same layer, the data encapsulated by the first NAL unit may be decoded without reference to the data encapsulated by the second NAL unit.

A bitstream may be associated with a plurality of operation points. Each operation point of a bitstream is associated with a set of layer identifiers (e.g., a set of nuh_layer_id values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. Thus, an operation point may correspond to a subset of NAL units in the bitstream. HEVC defines an operation point as a bitstream created from another bitstream by operation of the sub-bitstream extraction process with the another bitstream, a target highest TemporalId, and a target layer identifier list as inputs.

As introduced above, this disclosure relates to storing of video content in a file based on ISO base media file format (ISOBMFF). In particular, this disclosure describes various techniques for storing of video streams containing multiple coded layers, wherein each layer may be a scalable layer, a texture view, a depth view, or other types of layers or views. The techniques of this disclosure may be applied to, for example, storage of MV-HEVC video data, SHVC video data, 3D-HEVC video data, and/or other types of video data.

File formats and file format standards will now be briefly discussed. File format standards include ISO base media file format (ISOBMFF, ISO/IEC 14496-12, hereinafter, "ISO/IEC 14996-12") and other file format standards derived from the ISOBMFF, including MPEG-4 file format (ISO/IEC 14496-14), 3GPP file format (3GPP TS 26.244) and AVC file format (ISO/IEC 14496-15, hereinafter "ISO/IEC 14996-15"). Thus, ISO/IEC 14496-12 specifies the ISO base media file format. Other documents extend the ISO base media file format for specific applications. For example, ISO/IEC 14496-15 describes the carriage of NAL unit structured video in the ISO base media file format. H.264/AVC and HEVC, as well as their extensions, are examples of NAL unit structured video. ISO/IEC 14496-15 includes sections describing the carriage of H.264/AVC NAL units. Additionally, section 8 of ISO/IEC 14496-15 describes the carriage of HEVC NAL units.

The ISOBMFF is used as the basis for many codec encapsulation formats, such as the AVC File Format, as well as for many multimedia container formats, such as the MPEG-4 File Format, the 3GPP File Format (3GP), and the DVB File Format. In addition to continuous media, such as audio and video, static media, such as images, as well as metadata, can be stored in a file conforming to ISOBMFF. Files structured according to the ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams. Thus, although originally designed for storage, the ISOBMFF has proven valuable for streaming, e.g. for progressive download or DASH. For streaming purposes, the movie fragments defined in ISOBMFF can be used.

Figure 5A:
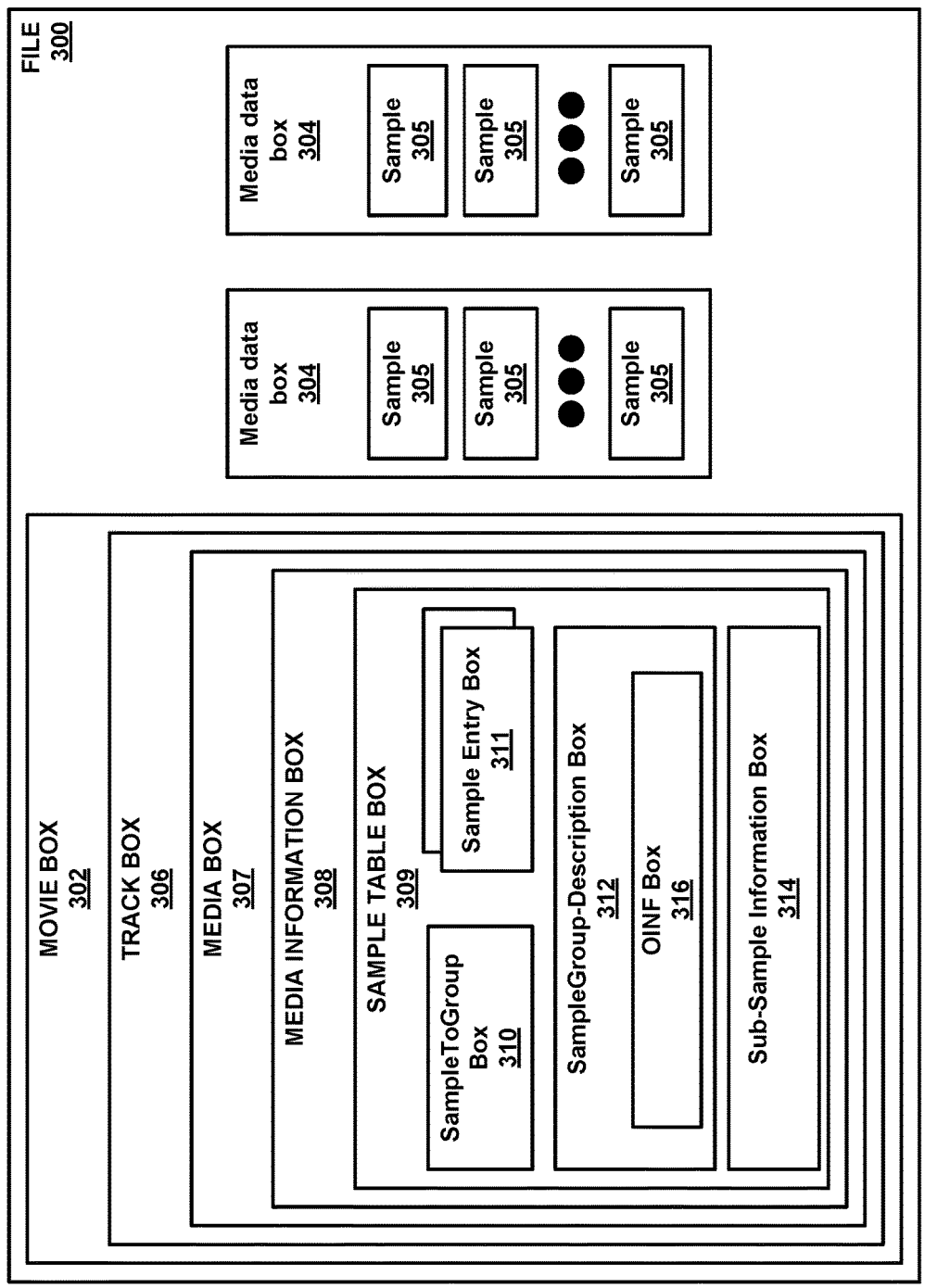
FIG. 5A is a conceptual diagram illustrating an example structure of a file in accordance with one or more techniques of this disclosure.
Figure 5B:
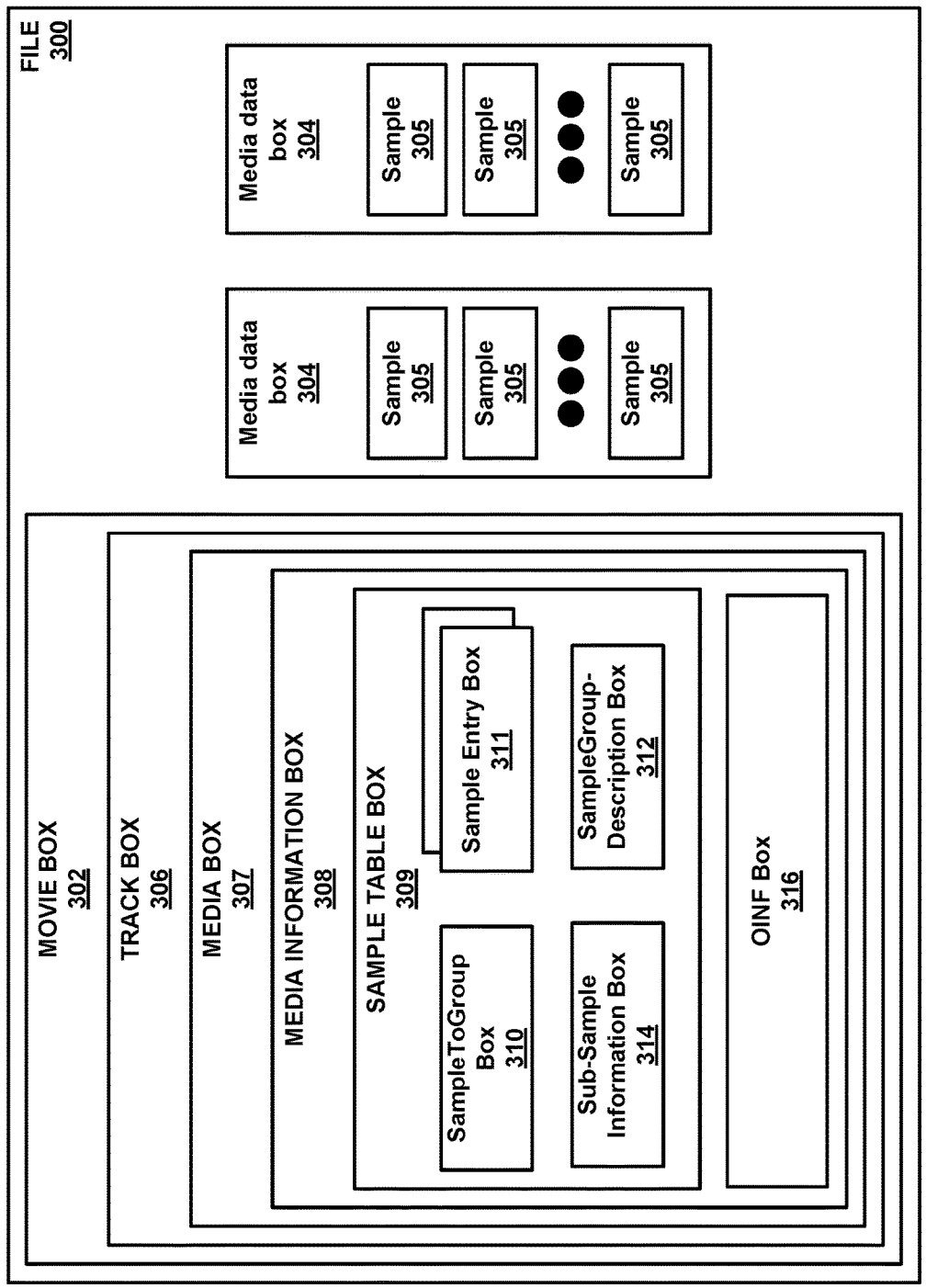
FIG. 5B is a conceptual diagram illustrating an example structure of a file in accordance with one or more techniques of this disclosure.
Figure 6:
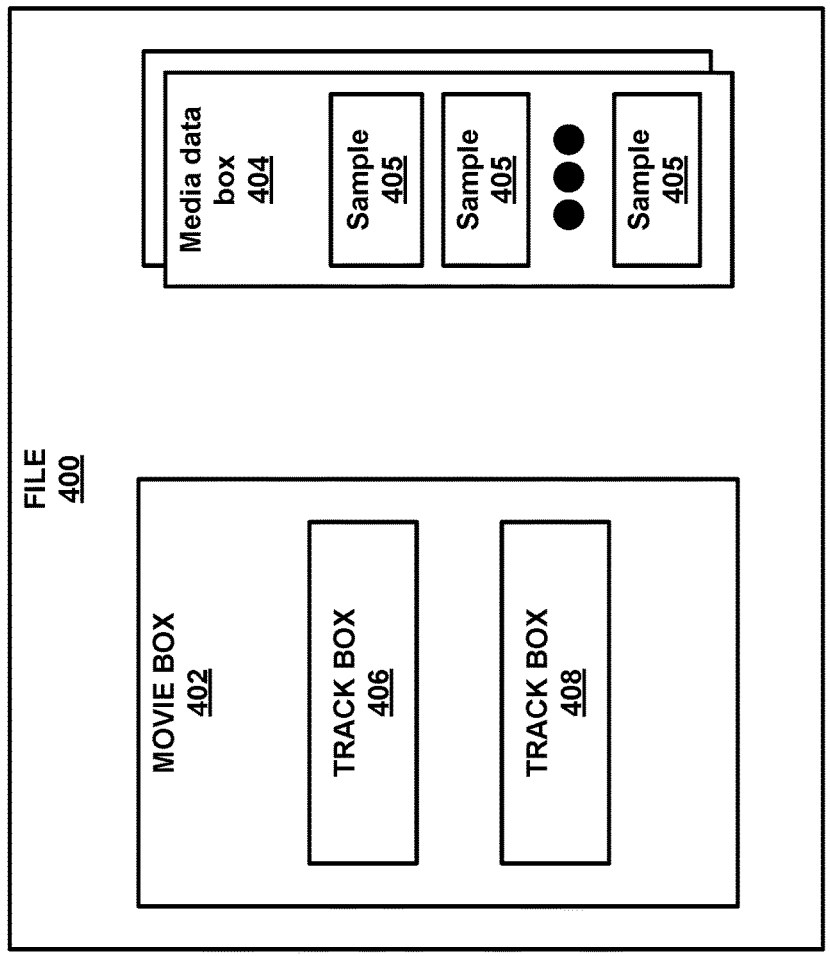
FIG. 6 is a conceptual diagram illustrating an example structure of a file in accordance with one or more techniques of this disclosure.

A file conforming to the HEVC file format may comprise a series of objects, called boxes. A box may be an object-oriented building block defined by a unique type identifier and length. For instance, a box may be the elementary syntax structure in the ISOBMFF, including a four-character coded box type, a byte count of the box, and a payload. In other words, a box may be a syntax structure comprising a coded box type, a byte count of the box, and a payload. In some instances, all data in a file conforming to the HEVC file format may be contained within boxes and there may be no data in the file that is not in a box. Thus, an ISOBMFF file may consist of a sequence of boxes, and boxes may contain other boxes. For instance, the payload of a box may include one or more additional boxes. FIG. 5A, FIG. 5B, and FIG. 6, described in detail elsewhere in this disclosure, show example boxes within a file, in accordance with one or more techniques of this disclosure.

A file conforming to the ISOBMFF may include various types of boxes. For example, a file conforming to the ISOBMFF may include a file type box, a media data box, a movie box, a movie fragment box, and so on. In this example, a file type box includes file type and compatibility information. A media data box may contain samples (e.g., coded pictures). A Movie box ("moov") contains metadata for continuous media streams present in the file. Each of the continuous media streams may be represented in the file as a track. For instance, a movie box may contain metadata regarding a movie (e.g., logical and timing relationships between samples, and also pointers to locations of samples). Movie boxes may include several types of sub-boxes. The sub-boxes in a movie box may include one or more track boxes. A track box may include information about an individual track of a movie. A track box may include a track header box that specifies overall information of a single track. In addition, a track box may include a media box that contains a media information box. The media information box may include a sample table box that contains data indexing of media samples in the track. Information in the sample table box may be used to locate samples in time and, for each of the samples of the track, a type, size, container, and offset into that container of the sample. Thus, the metadata for a track is enclosed in a Track box ("trak"), while the media content of a track is either enclosed in a Media Data box ("mdat") or directly in a separate file. The media content for tracks comprises (e.g., consists of) a sequence of samples, such as audio or video access units.

The ISOBMFF specifies the following types of tracks: a media track, which contains an elementary media stream, a hint track, which either includes media transmission instructions or represents a received packet stream, and a timed metadata track, which comprises time-synchronized metadata. The metadata for each track includes a list of sample description entries, each providing the coding or encapsulation format used in the track and the initialization data needed for processing that format. Each sample is associated with one of the sample description entries of the track.

The ISOBMFF enables specifying sample-specific metadata with various mechanisms. Specific boxes within the Sample Table box ("stbl") have been standardized to respond to common needs. For example, a Sync Sample box ("stss") is a box within a Sample Table box. The Sync Sample box is used to list the random access samples of the track. This disclosure may refer to a sample listed by the Sync Sample box as a sync sample. In another example, a sample grouping mechanism enables mapping of samples according to a four-character grouping type into groups of samples sharing the same property specified as a sample group description entry in the file. Several grouping types have been specified in the ISOBMFF.

A sample table box may include one or more SampleToGroup boxes and one or more sample group description boxes (i.e., SampleGroupDescription boxes). A SampleToGroup box may be used to determine a sample group to which a sample belongs, along with an associated description of the sample group. In other words, a SampleToGroup box may indicate a group to which a sample belongs. A SampleToGroup box may have a box type of "sbgp." A SampleToGroup box may include a grouping type element (e.g., grouping_type). The grouping type element may be an integer that identifies a type (i.e., a criterion used to form the sample groups) of a sample grouping. Furthermore, a SampleToGroup box may include one or more entries. Each entry in a SampleToGroup box may be associated with a different, non-overlapping series of consecutive samples in the track. Each entry may indicate a sample count element (e.g., sample_count) and a group description index element (e.g., group_description_index). The sample count element of an entry may indicate a number of samples associated with the entry. In other words, the sample count element of the entry may be an integer that gives the number of consecutive samples with the same sample group descriptor.

The group description index element may identify a SampleGroupDescription box that contains a description of the samples associated with the entry. The group description index elements of multiple entries may identify the same SampleGroupDescription box.

Current file format designs may have one or more problems. To store video content of a particular video codec based on the ISOBMFF, a file format specification to that video codec may be needed. For storage of video streams containing multiple layers such as MV-HEVC and SHVC, it is possible to reuse some of the concepts from the SVC and MVC file format. However, many parts cannot be directly used for SHVC and MV-HEVC video streams. Direct application of the HEVC file format has at least the following shortcomings: SHVC and MV-HEVC bitstreams can start with an access unit that contains IRAP picture in the base layer, but may also contain other non-IRAP pictures in other layers or vice versa. The sync sample currently does not allow indication of such a point for random access.

This disclosure describes potential solutions to the above problems, as well as provides other potential improvements, to enable efficient and flexible storage of video streams containing multiple layers. The techniques described in this disclosure potentially apply to any file format for storing of such video content coded by any video codec, though the description is specific to storage of SHVC and MV-HEVC video streams based on the HEVC file format, which is specified in Clause 8 of ISO/IEC 14496-15.

An example implementation of some techniques of this disclosure is described below. The example implementation described below is based on the latest integrated specification of 14496-15 in MPEG output document W13478. Changes to Annex A (shown with underlining) and the sections added (Section 9 for SHVC and Section 10 for MV-HEVC) are included below. In other words, particular examples of this disclosure may modify Annex A of ISO/IEC 14496-15 and may add sections 9 and/or 10 to ISO/IEC 14496-15. Text shown with underlining and double underlining may be of particular relevance to the examples of this disclosure. Although the term SHVC is used in various places in the examples described herein, the design of this disclosure is actually not only just to support the SHVC codec, but instead all multi-layer codec, including MV-HEVC, 3D-HEVC can be supported, unless otherwise explicitly mentioned.

The ISOBMFF specification specifies six types of Stream Access Points (SAPs) for use with DASH. The first two SAP types (types 1 and 2) correspond to IDR pictures in H.264/AVC and HEVC. The third SAP type (type 3) corresponds to open-GOP random access points hence BLA or CRA pictures in HEVC. The fourth SAP type (type 4) corresponds to GDR random access points.

In current L-HEVC file format, some high level information (e.g., information of layers in the bitstream, bit-rate, frame-rate, temporal sub-layers, parallelism, operation points, etc.) are signaled in LHEVCSampleEntry, HEVCLHVCSampleEntry, LHVCDecoderConfigurationRecord, track content info ('tcon') and OperationPointsInformationBox ('oinf'). In one example, the syntax design of the aforementioned boxes is as follows:

Based on the current structure of the above boxes, and information contained therein, in order to playback the content in the file, a player may be configured to first find the 'oinf' box (only one in the file) to know what operation points are included, and then choose one of the operation points to be played. The video player may then checks the 'tcon' boxes (one in each track containing L-HEVC video) to know which tracks contain the layers of the chosen operation points.

```
//LHVC and HEVCLHVC sample entry
class LHEVCConfigurationBox extends Box('lhvC') {
    LHEVCDecoderConfigurationRecord( ) LHEVCConfig;
}
class HEVCLHVCSampleEntry( ) extends HEVCSampleEntry( ) {
    LHEVCConfigurationBox   lhvcconfig;
    MPEG4BitRateBox ( );                    // optional
    MPEG4ExtensionDescriptorsBox ( );       // optional
    extra_boxes  boxes;                     // optional
}
// Use this if track is not HEVC compatible
class LHEVCSampleEntry( ) extends VisualSampleEntry ('lhv1', or
'lhe1') {
    LHVCConfigurationBox  lhvcconfig;
    MPEG4BitRateBox ( );                    // optional
    MPEG4ExtensionDescriptorsBox ( );       // optional
    Box extra_boxes[ ];
}
aligned(8) class LHEVCDecoderConfigurationRecord {
    unsigned int(8) configurationVersion = 1;
    unsigned int(2) general_profile_space;
    unsigned int(1) general_tier_flag;
    unsigned int(5) general_profile_idc;
    unsigned int(32) general_profile_compatibility_flags;
    unsigned int(48) general_constraint_indicator_flags;
    unsigned int(8) general_level_idc;
    bit(1) complete_representation;
    bit(3) reserved = '111'b;
    unsigned int(12) min_spatial_segmentation_idc;
    bit(6) reserved = '111111'b;
    unsigned int(2) parallelismType;
    bit(6) reserved = '111111'b;
    unsigned int(2) chromaFormat;
    bit(5) reserved = '11111'b;
    unsigned int(3) bitDepthLumaMinus8;
    bit(5) reserved = '11111'b;
    unsigned int(3) bitDepthChromaMinus8;
    bit(16) avgFrameRate;
    bit(2) constantFrameRate;
    bit(3) numTemporalLayers;
    bit(1) temporalIdNested;
    unsigned int(2) lengthSizeMinusOne;
    unsigned int(8) numOfArrays;
    for (j=0; j < numOfArrays; j++) {
        bit(1) array_completeness;
        unsigned int(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
    unsigned int(16) operationPointIdx;
}
class TrackContentsInfoBox extends FullBox('tcon', version = 0, 0)){
    unsigned int (2) reserved
    unsigned int (6) num_layers_in_track
    for (i=0; i<num_layers_in_track; i++){
        unsigned int (4) reserved
        unsigned int (6) layer_id
        unsigned int (3) min_sub_layer_id
        unsigned int (3) max_sub_layer_id
    }
}
class OperationPointsInformation extends FullBox('oinf', version = 0, 0){
    unsigned int(16) scalability_mask
    unsigned int(2) reserved
    unsigned int(6) num_profile_tier_level
    for (i=1; i<=num_profile_tier_level; i++) {
        unsigned int(2) general_profile_space;
        unsigned int(1) general_tier_flag;
        unsigned int(5) general_profile_idc;
        unsigned int(32) general_profile_compatibility_flags;
        unsigned int(48) general_constraint_indicator_flags;
        unsigned int(8) general_level_idc;
```

-continued

```
    }
    unsigned int(16) num_operation_points
    for (i=0; i<num_operation_points) {
        unsigned int(16) operation_point_id
        unsigned int(8) max_temporal_id;
        unsigned int(8) layer_count
        for (i=0; i<layer_count; i++) {
            unsigned int(8) ptl_idx;
            unsigned int(6) layer_id;
            unsigned int(1) is_outputlayer;
            unsigned int(1) is_alternate_outputlayer;
        }
    }
    unsigned int(8) max_layer_count
    for (i=0; i<max_layer_count; i++) {
        unsigned int(8) dependent_layerID
        unsigned int(8) num_layers_dependent_on
        for (j=0; j< num_layers_dependent_on; j++) {
            unsigned int(8) dependent_on_layerID
        }
        for (j = 0; j < 16; j++) {
            if (scalability_mask & (1 << j))
                unsigned int(8) dimension_identifier
        }
    }
}
```

Based on the current structure of the above boxes, and information contained therein, in order to playback the content in the file, a player may be configured to first find the 'oinf' box (only one in the file) to know what operation points are included, and then choose one of the operation points to be played. The video player may then checks the 'tcon' boxes (one in each track containing L-HEVC video) to know which tracks contain the layers of the chosen operation points.

With the above basic usage of the current design in mind, this disclosure proposes that more information, such as a representation format (which includes spatial resolution, bit depth, and color format), bit rate, and frame rate, be included into the 'oinf' box to enable choosing of operation points. The sample entry in each track does include one set of such information, but only for a particular operation point. When multiple operation points are contained in one track, information for other operation points is missing.

Another issue relates to the fact that the semantics of many of the fields in LHEVCDecoderConfigurationRecord are not clear, and some of them are confusing. For example, the profile, tier and level (PTL), chromaFormat, bitDepthLumaMinus8, and bitDepthChromaMinus8 are layer-specific properties, but are currently said to apply to the operation point indicated by operationPointIdx. When the operation point contains more than one layer, the semantics are simply not clear.

Actually, based on the steps of the conventional basic usage of the design, some of the information in the sample entry is not really useful, particularly when there is sufficient information in the 'oinf' box for operation point selection.

Yet another issue is that, in SHVC and MV-HEVC, PTL is only signaled for each necessary layer (i.e., a layer that is either an output layer or a layer that is referred to directly or indirectly by an output layer within an operation point or both), and not for any unnecessary layer (a layer that is not a necessary layer). Therefore in the file format design, it may be unnecessary to signal PTL for unnecessary layers.

A summary of the methods and techniques described in this disclosure is listed below. Example detailed implementations are provided in later sections. The methods and techniques of this disclosure may be applied independently or may be applied in combination.

A first technique of this disclosure includes removing the signaling of the MPEG4BitRateBox( ) after the LHEVCConfigurationBox within the LHEVC sample entry and the HEVCLHVC sample entry. Instead, enable signaling of the bitrate information for each operation points in the 'oinf' box.

A second technique of this disclosure includes signaling information on the representation format (which includes spatial resolution, bit depth, and color format) for each operation point points in 'oinf' box.

A third technique of this disclosure includes removing from the LHEVCDecoderConfigurationRecord the PTL information, representation format information, and frame rate information, which are either already provided in the 'oinf' box or are proposed to be added to the 'oinf' box. The remaining information in the LHEVCDecoderConfigurationRecord applies to all layers contained in the track. In another example of the third technique, the design of LHEVCDecoderConfigurationRecord is restructured such that representation format information and frame rate information, and possibly additional parameters/information (e.g., parallelism information), are signaled for each layer. The syntax element unsigned int(2) parallelismType in an LHEVCDecoderConfigurationRecord may indicate what type of parallel decoding feature(s) may be used to decode the picture in the layer. Tile, wavefronts, and slices are examples of picture segmentation mechanisms that may be used to facilitate to parallel processing.

A fourth technique of this disclosure includes removing the operationPointIdx from LHEVCDecoderConfigurationRecord. In another example of the fourth technique, signaling of a list of operation point indices that are associated with the track in the LHEVCDecoderConfigurationRecord is enabled.

A fifth technique of this disclosure includes changing the semantics of the layer_count field in the 'oinf' box to count only necessary layers of an operation point.

Example implementations of the methods and techniques of the disclosure are described below. In examples below, text changes relative to HEVC and LHEVC file format are shown. Added text is shown between the identifiers [START INSERTION] and [END INSERTION]. Deleted text is shown between the identifiers [START DELETION] and [END DELETION].

A first implementation is described below. This section describes the detail modifications to the signaling of LHEVCSampleEntry, HEVCLHVCSampleEntry, LHVCDecoderConfigurationRecord and OperationPointsInformationBox ('oinf') for the disclosure techniques 1, 2, 3 (not including its example a.), 4 (not including its example a.) and 5.

```
class LHEVCConfigurationBox extends Box('lhvC') {
    LHEVCDecoderConfigurationRecord( ) LHEVCConfig;
}
class HEVCLHVCSampleEntry( ) extends HEVCSampleEntry( ) {
    LHEVCConfigurationBox    lhvcconfig;
    [START DELETION] MPEG4BitRateBox ( );                    //
```

```
optional [END DELETION]
    MPEG4ExtensionDescriptorsBox ( );      // optional
    extra_boxes         boxes;             // optional
}
// Use this if track is not HEVC compatible
class LHEVCSampleEntry( ) extends VisualSampleEntry ('lhv1', or 'lhe1') {
    LHVCConfigurationBox  lhvcconfig;
    [START DELETION] MPEG4BitRateBox ( );                    //
optional [END DELETION]
    MPEG4ExtensionDescriptorsBox ( );      // optional
    Box extra_boxes[ ];
}
aligned(8) class LHEVCDecoderConfigurationRecord {
    unsigned int(8) configurationVersion = 1;
    [START DELETION] unsigned int(2) general_profile_space;
    unsigned int(1) general_tier_flag;
    unsigned int(5) general_profile_idc;
    unsigned int(32) general_profile_compatibility_flags;
    unsigned int(48) general_constraint_indicator_flags;
    unsigned int(8) general_level_idc; [END DELETION]
    bit(1) complete_representation;
    bit(3) reserved = '111'b;
    unsigned int(12) min_spatial_segmentation_idc;
    bit(6) reserved = '111111'b;
    unsigned int(2) parallelismType;
    [START DELETION] bit(6) reserved = '111111'b;
    unsigned int(2) chromaFormat;
    bit(5) reserved = '11111'b;
    unsigned int(3) bitDepthLumaMinus8;
    bit(5) reserved = '11111'b;
    unsigned int(3) bitDepthChromaMinus8;
    bit(16) avgFrameRate;
    bit(2) constantFrameRate; [END DELETION]
    [START INSERTION] bit(2) reserved = '11'b; [END INSERTION]
    bit(3) numTemporalLayers;
    bit(1) temporalIdNested;
    unsigned int(2) lengthSizeMinusOne;
    unsigned int(8) numOfArrays;
    for (j=0; j < numOfArrays; j++) {
        bit(1) array_completeness;
        unsigned int(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
    [START DELETION] unsigned int(16) operationPointIdx; [END DELETION]
}
class OperationPointsInformation extends FullBox('oinf', version = 0, 0){
        unsigned int(16) scalability_mask
        unsigned int(2) reserved
        unsigned int(6) num_profile_tier_level
        for (i=1; i<=num_profile_tier_level; i++) {
            unsigned int(2) general_profile space;
            unsigned int(1) general_tier_flag;
            unsigned int(5) general_profile_idc;
            unsigned int(32) general_profile_compatibility_flags;
            unsigned int(48) general_constraint_indicator_flags;
            unsigned int(8) general_level_idc;
        }
        unsigned int(16) num_operation_points
        for (i=0; i<num_operation_points) {
            unsigned int(16) operation_point_id
            unsigned int(8) max_temporal_id;
            unsigned int(8) layer_count;
            for (i=0; i<layer_count; i++) {
                unsigned int(8) ptl_idx
                unsigned int(6) layer_id;
                unsigned int(1) is_outputlayer;
                unsigned int(1) is_alternate_outputlayer;
            }
            [START INSERTION]
            unsigned int(16) minPicWidth;
            unsigned int(16) minPicHeight;
            unsigned int(16) maxPicWidth;
            unsigned int(16) maxPicHeight;
            unsigned int(2) maxChromaFormat;
```

```
            unsigned int(3) maxBitDepthMinus8;
            unsigned int(1) reserved
            unsigned int(1) frame_rate_info_flag
            unsigned int(1) bit_rate_info_flag
            if (frame_rate_info_flag) {
                bit(16) avgFrameRate;
                unsigned int(6) reserved
                bit(2) constantFrameRate;
            }
            if (bit_rate_info_flag) {
                unsigned int(32) maxBitRate;
                unsigned int(32) avgBitRate;
            }[END INSERTION]
        }
        unsigned int(8) max_layer_count
        for (i=0; i<max_layer_count; i++) {
            unsigned int(8) dependent_layerID
            unsigned int(8) num_layers_dependent_on
            for (j=0; j< num_layers_dependent_on; j++) {
                unsigned int(8) dependent_on_layerID
            }
            for (j = 0; j < 16; j++) {
                if (scalability mask & (1 << j))
                    unsigned int(8) dimension_identifier
            }
        }
    }
}
```

...

layer_count: This field indicates the number of [START INSERTION] necessary [END INSERTION] layers that are a part of [START INSERTION] the [END INSERTION] [START DELETION] an [END DELETION] operation point.

...

[START INSERTION]
    minPicWidth specifies the least value of the luma width indicators as defined by the pic_width_in_luma_samples parameter in ISO/IEC 23008-2 for the stream of the operation point.
    minPicHeight specifies the least value of the luma height indicators as defined by the pic_height_in_luma_samples parameter in ISO/IEC 23008-2 for the stream of the operation point.
    maxPicWidth specifies the greatest value of the luma width indicators as defined by the pic_width_in_luma_samples parameter in ISO/IEC 23008-2 for the stream of the operation point.
    maxPicHeight specifies the greatest value of the luma height indicators as defined by the pic_height_in_luma_samples parameter in ISO/IEC 23008-2 for the stream of the operation point.
    maxChromaFormat specifies the greatest value of the chroma_format indicator as defined by the chroma_format_idc parameter in ISO/IEC 23008-2 for the stream of the operation point.
    maxBitDepthMinus8 specifies the greatest value of the luma and chroma bit depth indicators as defined by the bit_depth_luma_minus8 and bit_depth_chroma_minus8 parameters, respectively, in ISO/IEC 23008-2 for the stream of the operation point.
    frame_rate_info_flag equal to 0 indicates that no frame rate information is present for the operation point. The value 1 indicates that frame rate information is present for the operation point.
    bit_rate_info_flag equal to 0 indicates that no bitrate information is present for the operation point. The value 1 indicates that bitrate information is present for the operation point.
    avgFrameRate gives the average frame rate in units of frames/(256 seconds) for the operation point. Value 0 indicates an unspecified average frame rate.
    constantFrameRate equal to 1 indicates that the stream of the operation point is of constant frame rate. Value 2 indicates that the representation of each temporal layer in the stream of the operation point is of constant frame rate. Value 0 indicates that the stream of the operation point may or may not be of constant frame rate.
    maxBitRate gives the maximum bit rate in bits/second of the stream of the operation point, over any window of one second.
    avgBitRate gives the average bit rate in bits/second of the stream of the operation point.

...

[END INSERTION]

A second implementation is described below. This section described the detail modifications to the signaling of LHVC-DecoderConfigurationRecord for the disclosure example 3(a).

```
aligned(8) class LHEVCDecoderConfigurationRecord {
    unsigned int(8) configuration Version = 1;
    [START DELETION] unsigned int(2) general_profile_space;
    unsigned int(1) general_tier_flag;
    unsigned int(5) general_profile_idc;
    unsigned int(32) general_profile_compatibility_flags;
    unsigned int(48) general_constraint_indicator_flags;
    unsigned int(8) general_level_idc;
    bit(1) complete_representation;
    bit(3) reserved = '111'b; [END DELETION]
    [START INSERTION] bit(2) reserved = '11'b; [END INSERTION]
    [START INSERTION] unsigned int(6) num_layers; [END INSERTION]
    for (j=0; j < num_layers; j++) {
        [START INSERTION] unsigned int(8) layer_id; [END INSERTION]
        unsigned int(12) min_spatial_segmentation_idc;
        bit(6) reserved = '111111'b;
        unsigned int(2) parallelismType;
        bit(6) reserved = '111111'b;
        unsigned int(2) chromaFormat;
        [START INSERTION] bit(6) reserved = '111111'b; [END INSERTION]
        [START DELETION] bit(5) reserved = '11111'b; [ENDDELETION]
        unsigned int(3) bitDepthLumaMinus8;
        bit(5) reserved = '11111'b;
        unsigned int(3) bitDepthChromaMinus8;
        [START INSERTION] bit(5) reserved = '11111'b; [END INSERTION]
    [START DELETION] bit(16) avgFrameRate;
    bit(2) constantFrameRate; [END DELETION]
        bit(3) numTemporalLayers;
        bit(1) temporalIdNested;
        [START INSERTION] bit(4) reserved = '1111'b; [END INSERTION]
    }
    [START INSERTION] bit(1) complete_representation; [END INSERTION]
    unsigned int(2) lengthSizeMinusOne;
    [START INSERTION] bit(5) reserved = '11111'b; [END INSERTION]
    unsigned int(8) numOfArrays;
    for (j=0; j < numOfArrays; j++) {
        bit(1) array_completeness;
        unsigned int(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
    [START DELETION] unsigned int(16) operationPointIdx; [END DELETION]
}
[START INSERTION]
num_layers specifies the number of layers in the track.
layer_id specifies the layer ID value for which the information in this loop is provided.
[END INSERTION]
```

A third implementation is described below. This section describes the detail modifications to the signaling of LHVC-DecoderConfigurationRecord for the disclosure example 4(a).

```
aligned(8) class LHEVCDecoderConfigurationRecord {
    unsigned int(8) configurationVersion = 1;
    unsigned int(2) general_profile_space;
    unsigned int(1) general_tier_flag;
    unsigned int(5) general_profile_idc;
    unsigned int(32) general_profile_compatibility_flags;
    unsigned int(48) general_constraint_indicator_flags;
    unsigned int(8) general_level_idc;
    bit(1) complete_representation;   bit(3) reserved = '111'b;
    unsigned int(12) min_spatial_segmentation_idc;
    bit(6) reserved = '111111'b;
    unsigned int(2) parallelismType;
    bit(6) reserved = '111111'b;
    unsigned int(2) chromaFormat;
    bit(5) reserved = '11111'b;
```

```
unsigned int(3) bitDepthLumaMinus8;
bit(5) reserved = '11111'b;
unsigned int(3) bitDepthChromaMinus8;
bit(16) avgFrameRate;
bit(2) constantFrameRate;
bit(3) numTemporalLayers;
bit(1) temporalIdNested;
unsigned int(2) lengthSizeMinusOne;
unsigned int(8) numOfArrays;
for (j=0; j < numOfArrays; j++) {
        bit(1) array_completeness;
        unsigned int(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
}
[START DELETION] unsigned int(16) operationPointIdx; [END DELETION]
[START INSERTION]
unsigned int(16) numOfOperationPoints;
for (j=0; j < numOfOperationPoints; j++) {
        unsigned int(16) operationPointIdx;
} [END INSERTION]
}
```

[START INSERTION] numOperationPoints: This field signals the number of operation points that are available for the track. [END INSERTION] operationPointIdx: This field signals the index of the operation point documented in the operation point information box. [START DELETION] The values of general_profile_space, general_tier_flag, general_profile_idc, general_profile_compatibility_flags, general_constraint_indicator_flag and general_level_idc in LHEVCDecoderConfigurationRecord shall be the same as the respective values of the operationPointIdx-th operation point in the operation point information box. [END DELETION] [START INSERTION] The value of max_temporal_id in the operationPointIdx-th operation point in the operation point information box shall be less than or equal to the value of numTemporalLayers. [END INSERTION]

NOTE A track may be associated with one or [START DELETION] represent [END DELETION] more than one output layer set [START DELETION] and hence more than one profile [START DELETION]. A player can find out which layers are to be decoded and which layers are to be output corresponding to the profile information in LHEVCDecoderConfigurationRecord [START INSERTION] for the selected operation point with index operationPointIdx [END INSERTION] by investigating the information provided for the operationPointIdx-th operation point in the operation point information box.
    NOTE For each auxiliary picture layer included in the track, it is recommended to include, within nalUnit, an SEI NAL unit containing a declarative SEI message, such as the depth representation information SEI message for depth auxiliary picture layers, specifying characteristics of the auxiliary picture layer.

Figure 2:
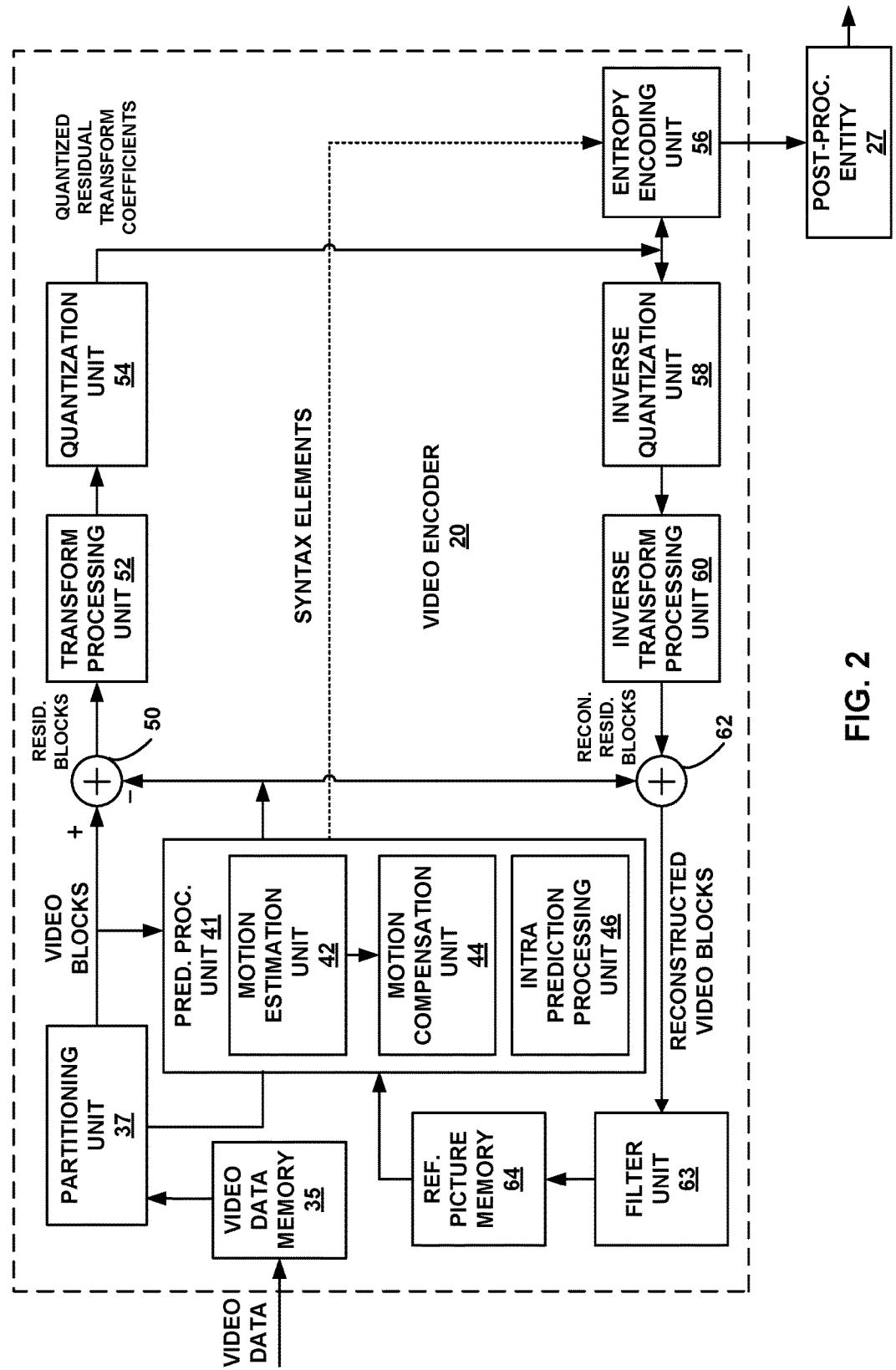
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may be configured to output single view, multiview, scalable, 3D, and other types of video data. Video encoder 20 may be configured to output video to post-processing entity 27. Post-processing entity 27 is intended to represent an example of a video entity, such as a MANE or splicing/editing device, that may process encoded video data from video encoder 20. In some instances, post-processing processing entity may be an example of a network entity. In some video encoding systems, post-processing entity 27 and video encoder 20 may be parts of separate devices, while in other instances, the functionality described with respect to post-processing entity 27 may be performed by the same device that comprises video encoder 20. Post-processing entity 27 may be a video device. In some examples, post-processing entity 27 may be the same as file generation device 34 of FIG. 1.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 37, prediction processing unit 41, filter unit 63, reference picture memory 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 2 as being an in loop filter, in other configurations, filter unit 63 may be implemented as a post loop filter.

Video data memory 35 of video encoder 20 may store video data to be encoded by the components of video encoder 20. The video data stored in video data memory 35 may be obtained, for example, from video source 18. Reference picture memory 64 may be a reference picture memory that stores reference video data for use in encoding video data by video encoder 20, e.g., in intra- or inter-coding modes. Video data memory 35 and reference picture memory 64 may be formed by any of a variety of memory devices, such as dynamic random access memory (DRAM), including synchronous DRAM (SDRAM), magnetoresistive RAM (MRAIVI), resistive RAM (RRAIVI), or other types of memory devices. Video data memory 35 and reference picture memory 64 may be provided by the same memory device or separate memory devices. In various examples, video data memory 35 may be on-chip with other components of video encoder 20, or off-chip relative to those components.

As shown in FIG. 2, video encoder 20 receives video data, and partitioning unit 37 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 may form a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or mode select unit 40, in some examples) may select an appropriate intra-prediction mode to use from the tested modes. For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

In any case, after selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 may form a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 may entropy encode syntax elements representing the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Video encoder 20 represents an example of a video coder configured generate video data that may be stored using the file format techniques described in this disclosure.

Figure 3:
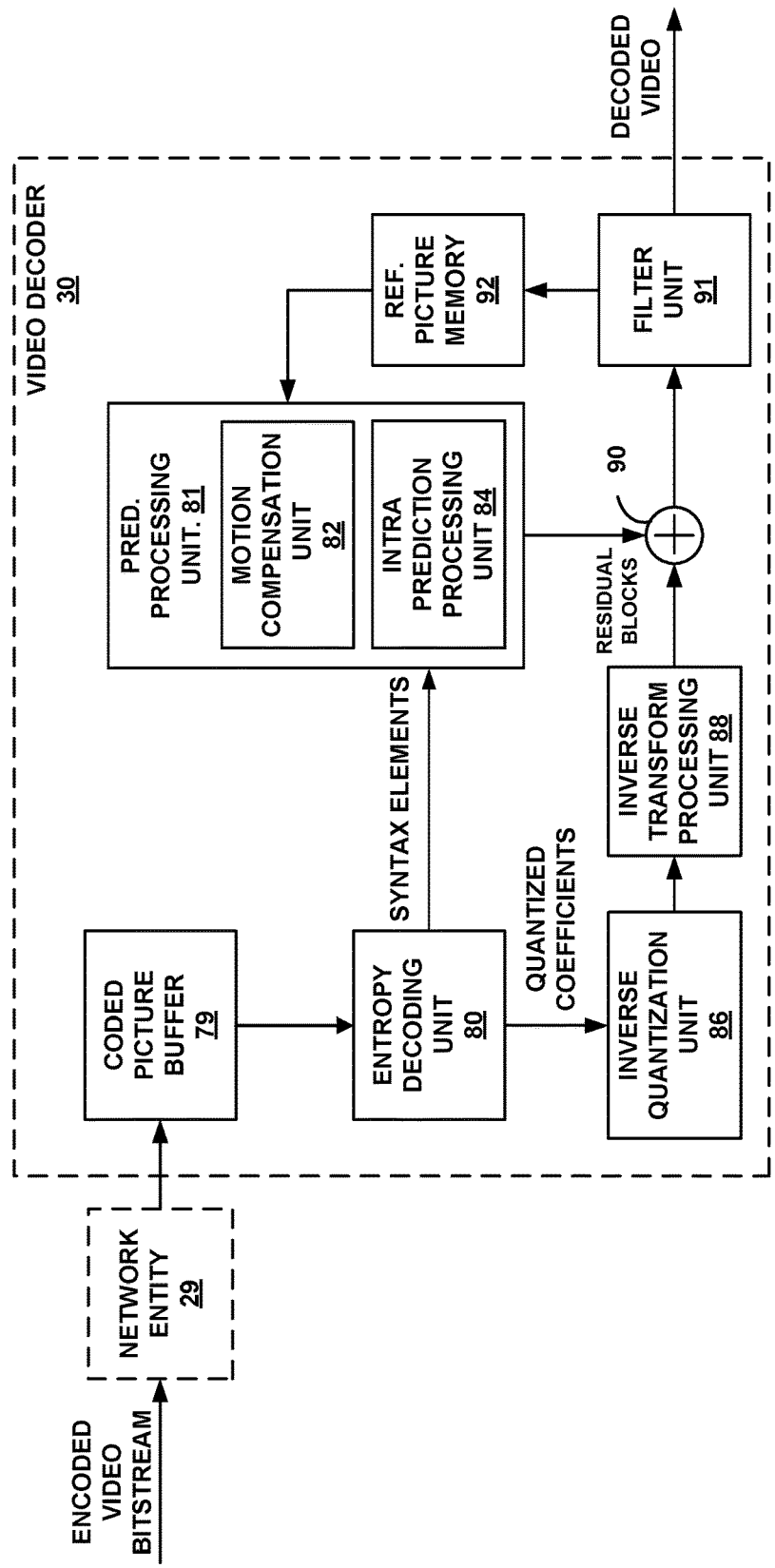
FIG. 3 is a block diagram illustrating an example video decoder that may implement the techniques described in this disclosure.

FIG. 3 is a block diagram illustrating an example video decoder 30 that may implement the techniques described in this disclosure. Video decoder 30 may be configured to decode single view, multiview, scalable, 3D, and other types of video data. In the example of FIG. 3, video decoder 30 includes an entropy decoding unit 80, prediction processing unit 81, inverse quantization unit 86, inverse transform processing unit 88, summer 90, filter unit 91, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

A coded picture buffer (CPB) 79 may receive and store encoded video data (e.g., NAL units) of a bitstream. The video data stored in CPB 79 may be obtained, for example, from link 16, e.g., from a local video source, such as a camera, via wired or wireless network communication of video data, or by accessing physical data storage media. CPB 79 may form a video data memory that stores encoded video data from an encoded video bitstream. CPB 79 may be a reference picture memory that stores reference video data for use in decoding video data by video decoder 30, e.g., in intra- or inter-coding modes. CPB 79 and reference picture memory 92 may be formed by any of a variety of memory devices, such as dynamic random access memory (DRAM), including synchronous DRAM (SDRAM), magnetoresistive RAM (MRAM), resistive RAM (RRAM), or other types of memory devices. CPB 79 and reference picture memory 92 may be provided by the same memory device or separate memory devices. In various examples, CPB 79 may be on-chip with other components of video decoder 30, or off-chip relative to those components.

During the decoding process, video decoder 30 receives an encoded video bitstream that represents video blocks of an encoded video slice and associated syntax elements from video encoder 20. Video decoder 30 may receive the encoded video bitstream from network entity 29. Network entity 29 may, for example, be a server, a MANE, a video editor/splicer, or other such device configured to implement one or more of the techniques described above. Network entity 29 may or may not include a video encoder, such as video encoder 20. Some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30. Network entity 29 may be considered to be a video device. Furthermore, in some examples, network entity 29 is the file generation device 34 of FIG. 1.

Entropy decoding unit 80 of video decoder 30 entropy decodes particular syntax elements of the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and may use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 3 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Video decoder 30 of FIG. 3 represents an example of a video decoder configured to decode video data that may be stored using the file format techniques described in this disclosure.

Figure 4:
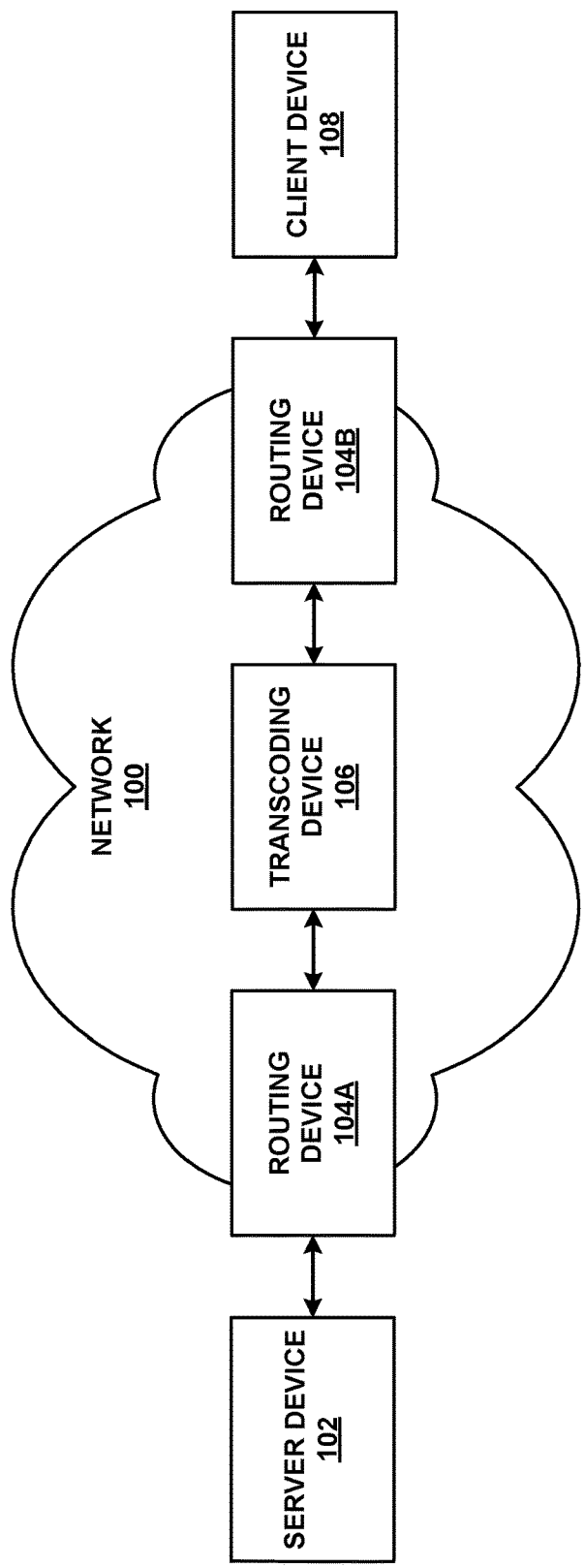
FIG. 4 is a block diagram illustrating an example set of devices that form part of a network.

FIG. 4 is a block diagram illustrating an example set of devices that form part of network 100. In this example, network 100 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 1), while client device 108 may correspond to destination device 14 (FIG. 1), in some examples.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

The techniques of this disclosure may be implemented by network devices such routing devices 104 and transcoding device 106, but also may be implemented by client device 108. In this manner, routing devices 104, transcoding device 106, and client device 108 represent examples of devices configured to perform the techniques of this disclosure. Moreover, the devices of FIG. 1, and encoder 20 illustrated in FIG. 2 and decoder 30 illustrated in FIG. 3 are also examples of devices that can be configured to perform one or more of the techniques of this disclosure.

FIG. 5A is a conceptual diagram illustrating an example structure of a file 300, in accordance with one or more techniques of this disclosure. In the example of FIG. 5A, file 300 includes a movie box 302 and a plurality of media data boxes 304. Although illustrated in the example of FIG. 5A as being in the same file, in other examples movie box 302 and media data boxes 304 may be in separate files. As indicated above, a box may be an object-oriented building block defined by a unique type identifier and length. For instance, a box may be the elementary syntax structure in the ISOBMFF, including a four-character coded box type, a byte count of the box, and a payload.

Movie box 302 may contain metadata for tracks of file 300. Each track of file 300 may comprise a continuous stream of media data. Each of media data boxes 304 may include one or more samples 305. Each of samples 305 may comprise an audio or video access unit. As described elsewhere in this disclosure, each access unit may comprise multiple coded pictures in multi-view coding (e.g., MV-HEVC and 3D-HEVC) and scalable video coding (e.g., SHVC). For instance, an access unit may include one or more coded pictures for each layer.

Furthermore, in the example of FIG. 5A, movie box 302 includes a track box 306. Track box 306 may enclose metadata for a track of file 300. In other examples, movie box 302 may include multiple track boxes for different tracks of file 300. Track box 306 includes a media box 307. Media box 307 may contain all objects that declare information about the media data within the track. Media box 307 includes a media information box 308. Media information box 308 may contain all objects that declare characteristic information of the media of the track. Media information box 308 includes a sample table box 309. Sample table box 309 may specify sample-specific metadata.

In the example of FIG. 5A, sample table box 309 includes a SampleToGroup box 310 and a SampleGroupDescription box 312, and SampleGroupDescription box 312 includes oinf box 316. In other examples, sample table box 309 may include other boxes in addition to SampleToGroup box 310 and SampleGroupDescription box 312, and/or may include multiple SampleToGroup boxes and SampleGroupDescription boxes. SampleToGroup box 310 may map samples (e.g., particular ones of samples 305) to a group of samples. SampleGroupDescription Box 312 may specify a property shared by the samples in the group of samples (i.e., sample group). Furthermore, sample table box 309 may include a plurality of sample entry boxes 311. Each of the sample entry boxes 311 may correspond to a sample in the group of samples. In some examples, sample entry boxes 311 are instances of a Random Accessible Sample Entry class that extends a base sample group description class.

In accordance with one or more techniques of this disclosure, SampleGroupDescription Box 312 may specify that each sample of the sample group contains at least one IRAP picture. In this way, file generation device 34 may generate a file that comprises a track box 306 that contains metadata for a track in file 300. Media data for the track comprises a sequence of samples 305. Each of the samples may be a video access unit of multi-layer video data (e.g., SHVC, MV-HEVC, or 3D-HEVC video data). Furthermore, as part of generating file 300, file generation device 34 may generate, in file 300, an additional box (i.e., sample table box 309) that documents all of samples 305 containing at least one IRAP picture. In other words, the additional box identifies all of samples 305 containing at least one IRAP picture. In the example of FIG. 5A, the additional box defines a sample group that documents (e.g., identifies) all of samples 305 containing at least one IRAP picture. In other words, the additional box specifies that the samples 305 containing at least one IRAP picture belong to a sample group.

According to the techniques of this disclosure, SampleGroupDescription Box 312 may include an oinf box 316. The oinf box may store representation format information for each operation point of the video data. The representation format information may include one or more of a spatial resolution, a bit depth, or a color format. Additionally, the oinf box may store a layer count that indicates a number of necessary layers of an operation point of the video data. The oinf box may additionally store bitrate information for each operation point of the video data. Thus, there may exist no need for signaling a bit rate box after a configuration box due to the bit rate information being signaled in the oinf box.

Additionally, there may exist no need for storing profile, tier, and level PTL information, representation format information, and frame rate information in a decoder configuration record of the file format. All other information in the decoder configuration record may be associated with all layers of the video data in a track. A decoder configuration record for each layer of the video data may store representation format information and frame rate information. The decoder configuration record may store parallelism information for each layer of the video data. Files typically only include one decoder configuration record for a track, but a track may contain one or more layers and one or more operation points. PTL information, representation format information, and frame rate information may be associated with either each layer or each OP. Thus, unlike for the HEVC file format which only supports one layer, a decoder configuration record may not be able to properly facilitate this association for the LHEVC file format that supports multiple layers.

The decoder configuration record may not store an operation point index in a decoder configuration record, where an operation point index refers to an index of the operation point documented in the operation point information box. Storing an operation point index in a decoder configuration record may cause a device playing a track (i.e. the associated with that decoder configuration record) to play the operation point referred to by that operation point index. However, there may be more operation points available. Removing the operation point index may better enable a playback device to identify all operation points supported by a file. The decoder configuration record may store a list of operation point indices associate with a track of the video data. The decoder configuration record may, for example, be derived from information in sample entry box 311 of FIG. 5A.

A decoder configuration record stores information such as the size of a length field used in each sample to indicate the length of its contained NAL units as well as the parameter sets, if stored in the sample entry. A decoder configuration record may, for example, be externally framed (e.g., its size must be supplied by the structure which contains it). The decoder configuration record may also contain a version field to identify a version of a specification being followed, with incompatible changes to the record being indicated by a change of version number. By contrast, compatible extensions to this record may not necessitate a change to the configuration version code. The decoder configuration record may also include values for several HEVC syntax elements such as general_profile_space, general_tier_flag, general_profile_idc, general_profile_compatibility_flags, general_constraint_indicator_flags, general_level_idc, min_spatial_segmentation_idc, chroma_format_idc, bit_depth_luma_minus8 and bit_depth_chroma_minus8, which are defined in HEVC. A decoder configuration record may contain general information that associates, with the track that contains the configuration record, the number of temporal sub layers, segmentation information, parallelism type supported, and parameter sets NAL units (e.g. VPS, SPS, PPS, SEI, etc.)

Furthermore, in accordance with one or more techniques of this disclosure, each of sample entry boxes 311 may include a value (e.g., all_pics_are_IRAP) indicating whether all coded pictures in the corresponding sample are IRAP pictures. In some examples, the value being equal to 1 specifies that not all coded picture the sample are IRAP pictures. The value being equal to 0 specifies that it is not required that each coded picture in each sample of the sample group is an IRAP picture.

In some examples, when not all coded pictures in a particular sample are IRAP pictures, file generation device 34 may include, in one of sample entry boxes 311 for the particular sample, a value (e.g., num_IRAP_pics) indicating a number of IRAP pictures in the particular sample. Additionally, file generation device 34 may include, in the sample entry for the particular sample, values indicating layer identifiers of IRAP pictures in the particular sample. File generation device 34 may also include, in the sample entry for the particular sample, a value indicating a NAL unit type of VCL NAL units in IRAP pictures of the particular sample.

Furthermore, in the example of FIG. 5A, sample table box 309 includes a sub-sample information box 314. Although the example of FIG. 5A only shows one sub-sample information box, sample table box 309 may include multiple sub-sample information boxes. In general, a sub-sample information box is designed to contain sub-sample information. A sub-sample is a contiguous range of bytes of a sample. ISO/IEC 14496-12 indicates that the specific definition of a sub-sample shall be supplied for a given coding system, such as H.264/AVC or HEVC.

Section 8.4.8 of ISO/IEC 14496-15 specifies a definition of a sub-sample for HEVC. Particularly, section 8.4.8 of ISO/IEC 14496-15 specifies that for the use of the sub-sample information box (8.7.7 of ISO/IEC 14496-12) in a HEVC stream, a sub-sample is defined on the basis of a value of a flags field of the sub-sample information box. In accordance with one or more techniques of this disclosure, if the flags field in sub-sample information box 314 is equal to 5, a sub-sample corresponding to sub-sample information box 314 contains one coded picture and the associated non-VCL NAL units. The associated non-VCL NAL units may include NAL units containing SEI messages applicable to the coded picture and NAL units containing parameter sets (e.g., VPSs, SPSs, PPSs, etc.) applicable to the coded picture.

Thus, in one example, file generation device 34 may generate a file (e.g., file 300) that comprises a track box (e.g., track box 306) that contains metadata for a track in the file. In this example, media data for the track comprises a sequence of samples, each of the samples being a video access unit of multi-layer video data (e.g., SHVC, MV-HEVC, or 3D-HEVC video data). Furthermore, in this example, as part of file generation device 34 generating the file, file generation device 34 may generate, in the file, a sub-sample information box (e.g., sub-sample information box 314) that contains flags that specify a type of sub-sample information given in the sub-sample information box. When the flags have a particular value, a sub-sample corresponding to the sub-sample information box contains exactly one coded picture and zero or more non-VCL NAL units associated with the coded picture.

Furthermore, in accordance with one or more techniques of this disclosure, if the flags field of sub-sample information box 314 is equal to 0, sub-sample information box 314 further includes a DiscardableFlag value, a NoInterLayerPredFlag value, a LayerId value, and a TempId value. If the flags field of sub-sample information box 314 is equal to 5, sub-sample information box 314 may include a DiscardableFlag value, a VclNalUnitType value, a LayerId value, a TempId value, a NoInterLayerPredFlag value, a SubLayerRefNalUnitFlag value, and a reserved value.

SubLayerRefNalUnitFlag equal to 0 indicates that all NAL units in the sub-sample are VCL NAL units of a sub-layer non-reference picture as specified in ISO/IEC 23008-2 (i.e., HEVC). SubLayerRefNalUnitFlag equal to 1 indicates that all NAL units in the sub-sample are VCL NAL units of a sub-layer reference picture as specified in ISO/IEC 23008-2 (i.e., HEVC). Thus, when file generation device 34 generates sub-sample information box 314 and the flags have a particular value (e.g., 5), file generation device 34 includes, in sub-sample information box 314, an additional flag that indicates whether all NAL units in the sub-sample are VCL NAL units of a sub-layer non-reference picture.

The DiscardableFlag value indicates a value of a discardable_flag value of the VCL NAL units in the sub-sample. As specified in section A.4 of ISO/IEC 14496-15, the discardable_flag value shall be set to 1 if and only if all the extracted or aggregated NAL units have the discardable_flag set to 1, and set to 0 otherwise. A NAL unit may have a discardable_flag set to 1 if a bitstream containing the NAL unit may be correctly decoded without the NAL unit. Thus, a NAL unit may be "discardable" if a bitstream containing the NAL unit may be correctly decoded without the NAL unit. All the VCL NAL units in the sub-sample shall have the same discardable_flag value. Thus, when file generation device 34 generates sub-sample information box 314 and the flags have a particular value (e.g., 5), file generation device 34 includes, in sub-sample information box 314, an additional flag (e.g., discardable_flag) that indicates whether all of the VCL NAL units of the sub-sample are discardable.

The NoInterLayerPredFlag value indicates the value of the inter_layer_pred_enabled_flag of the VCL NAL units in the sub-sample. The inter_layer_pred_enabled_flag shall be set to 1 if and only if all the extracted or aggregated VCL NAL units have the inter_layer_pred_enabled_flag set to 1, and set to 0 otherwise. All the VCL NAL units in the sub-sample shall have the same value of inter_layer_pred_enabled_flag. Thus, when file generation device 34 generates sub-sample information box 314 and the flags have a particular value (e.g., 5), file generation device 34 includes, in sub-sample information box 314, an additional value (e.g., inter_layer_pred_enabled_flag) that indicates whether inter-layer prediction is enabled for all VCL NAL units of the sub-sample.

LayerId indicates the nuh_layer_id value of the NAL units in the sub-sample. All the NAL units in the sub-sample shall have the same nuh_layer_id value. Thus, when file generation device 34 generates sub-sample information box 314 and the flags have a particular value (e.g., 5), file generation device 34 includes, in sub-sample information box 314, an additional value (e.g., LayerId) that indicates a layer identifier of each NAL unit of the sub-sample.

TempId indicates the TemporalId value of the NAL units in the sub-sample. All the NAL units in the sub-sample shall have the same TemporalId value. Thus, when file generation device 34 generates sub-sample information box 314 and the flags have a particular value (e.g., 5), file generation device 34 includes in, sub-sample information box 314, an additional value (e.g., TempId) that indicates a temporal identifier of each NAL unit of the sub-sample.

VclNalUnitType indicates the nal_unit_type syntax element of the VCL NAL units in the sub-sample. The nal_unit_type syntax element is a syntax element in a NAL unit header of a NAL unit. The nal_unit_type syntax element specifies the type of the RBSP contained in the NAL unit. All the nal_unit_type VCL NAL units in the sub-sample shall have the same nal_unit_type value. Thus, when file generation device 34 generates sub-sample information box 314 and the flags have a particular value (e.g., 5), file generation device 34 includes, in sub-sample information box 314, an additional value (e.g., VclNalUnitType) that indicates a NAL unit type of VCL NAL units of the sub-sample. All the VCL NAL units of the sub-sample have the same NAL unit type.

FIG. 5B is a conceptual diagram illustrating an alternate example structure of file 300, in accordance with one or more techniques of this disclosure. In the example of FIG. 5B, instead of oinf box 316 being included in sample group-description box 312, as shown in FIG. 5A, oinf box 316 is included in media information box 308 as a separate box from sample table box 309. The content and function of the various boxes in FIG. 3B may otherwise be the same as was described with respect to FIG. 5A.

FIG. 6 is a conceptual diagram illustrating an example structure of a file 300, in accordance with one or more techniques of this disclosure. As specified in section 8.4.9 of ISO/IEC 14496-15, HEVC allows for file format samples that are used only for reference and not output. For example, HEVC allows for a non-displayed reference picture in video.

Furthermore, section 8.4.9 of ISO/IEC 14496-15 specifies that when any such non-output sample is present in a track, the file shall be constrained as follows.
1. A non-output sample shall be given a composition time which is outside the time-range of the samples that are output.
2. An edit list shall be used to exclude the composition times of the non-output samples.
3. When the track includes a CompositionOffsetBox ('ctts'),
    a. version 1 of the CompositionOffsetBox shall be used,
    b. the value of sample_offset shall be set equal to $-2^{31}$ for each non-output sample,
    c. the CompositionToDecodeBox ('cslg') should be contained in the SampleTableBox ('stbl') of the track, and
    d. when the CompositionToDecodeBox is present for the track, the value of leastDecodeToDisplayDelta field in the box shall be equal to the smallest composition offset in the CompositionOffsetBox excluding the sample_offset values for non-output samples. NOTE: Thus, leastDecodeToDisplayDelta is greater than $-2^{31}$.

As specified in ISO/IEC 14496-12, the CompositionOffsetBox provides the offset between decoding time and composition time. The CompositionOffsetBox includes a set of sample_offset values. Each of the sample_offset values is a non-negative integer that gives the offset between composition time and decoding time. Composition time refers to a time at which a sample is to be output. Decoding time refers to a time at which a sample is to be decoded.

As indicated above, a coded slice NAL unit may include a slice segment header. The slice segment header may be part of a coded slice segment and may contain data elements pertaining to the first or all CTUs in the slice segment. In HEVC, the slice segment header includes a pic_output_flag syntax element. In general, the pic_output_flag syntax element is included in a first slice segment header of a slice of a picture. Hence, this disclosure may refer to the pic_output_flag of the first slice segment header of the slice of the picture as the pic_output_flag of the picture.

As specified in section 7.4.7.1 of the HEVC WD, the pic_output_flag syntax element affects the decoded picture output and removal processes as specified in Annex C of HEVC WD. In general, if the pic_output_flag syntax element of a slice segment header for a slice segment is 1, a picture that includes a slice corresponding to the slice segment header is output. Otherwise, if the pic_output_flag syntax element of the slice segment header for a slice segment is 0, the picture that includes the slice corresponding to the slice segment header may be decoded for use as a reference picture, but is not output.

In accordance with one or more techniques of this disclosure, the references in section 8.4.9 of ISO/IEC 14496-15 to HEVC may be replaced with corresponding references to SHVC, MV-HEVC, or 3D-HEVC. Furthermore, in accordance with one or more techniques of this disclosure, when an access unit contains some coded pictures that have pic_output_flag equal to 1 and some other coded pictures that have pic_output_flag equal to 0, at least two tracks must be used to store the stream. For each respective one of the tracks, all coded pictures in each sample of the respective track have the same value of pic_output_flag. Thus, all coded pictures in a first one of the tracks have pic_output_flag equal to 0 and all coded pictures in a second one of the tracks have pic_output_flag equal to 1.

Accordingly, in the example of FIG. 6, file generation device 34 may generate a file 400. Similar to file 300 in the example of FIG. 5A, file 400 includes a movie box 402 and one or more media data boxes 404. Each of media data boxes 404 may correspond to a different track of file 400. Movie box 402 may contain metadata for tracks of file 400. Each track of file 400 may comprise a continuous stream of media data. Each of media data boxes 404 may include one or more samples 405. Each of samples 405 may comprise an audio or video access unit.

As indicated above, in some examples, when an access unit contains some coded pictures that have pic_output_flag equal to 1 and some other coded pictures that have pic_output_flag equal to 0, at least two tracks must be used to store the stream. Accordingly, in the example of FIG. 6, movie box 402 includes a track box 406 and a track box 408. Each of track boxes 406 and 408 enclose metadata for a different track of file 400. For instance, track box 406 may enclose metadata for a track having coded pictures with pic_output_flag equal to 0, and no pictures with pic_output_flag equal to 1. Track box 408 may enclose metadata for a track having coded pictures with pic_output_flag equal to 1, and no pictures with pic_output_flag equal to 0.

Thus, in one example, file generation device 34 may generate a file (e.g., file 400) that comprises a media data box (e.g., media data box 404) that encloses (e.g., comprises) media content. The media content comprises a sequence of samples (e.g., samples 405). Each of the samples may be an access unit of multi-layer video data. In this example, when file generation device 34 generates the file, responsive to a determination that at least one access unit of the bitstream includes a coded picture that has a picture output flag equal to 1 and a coded picture that has a picture output flag equal to 0, file generation device 34 may use at least two tracks to store the bitstream in the file. For each respective track from the at least two tracks, all coded pictures in each sample of the respective track have the same value of the picture output flag. Pictures having picture output flags equal to 1 are allowed to be output and pictures having picture output flags equal to 0 are allowed to be used as reference pictures but are not allowed to be output.

Figure 7:
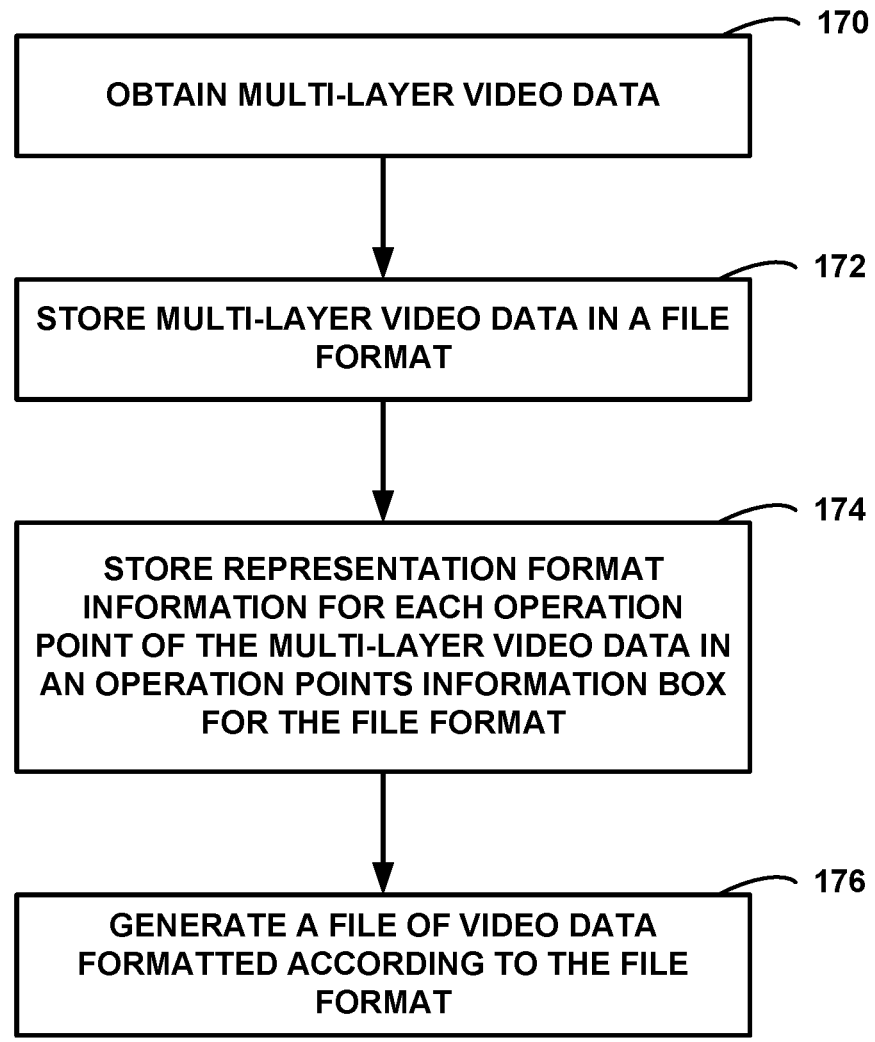
FIG. 7 is a flowchart illustrating an example operation of a file generation device in accordance with one or more techniques of this disclosure.

FIG. 7 is a flowchart illustrating an example operation of file generation device 34, in accordance with one or more techniques of this disclosure. The operation of FIG. 7, along with operations illustrated in other flowcharts of this disclosure, are examples. Other example operations in accordance with the techniques of this disclosure may include more, fewer, or different actions.

In the example of FIG. 7, file generation device 34 generates a file. As part of generating the file, file generation device 34 obtains multi-layer video data (170) and stores the multi-layer video data in a file format (172). File generation device 34 stores representation format information for each operation point of the multi-layer video data in an oinf box of the file format (174). File generation device 34 generates a file of video data formatted according to the file format (176). The representation format information may include one or more of a spatial resolution, a bit depth, or a color format. File generation device 34 may additionally or alternatively store bitrate information for each operation point of the multi-layer video data in the oinf box of the file format and/or may not signaling a bit rate box after a configuration box of the file format. File generation device 34 may additionally or alternatively not store profile, tier, and level (PTL) information, representation format information, and frame rate information in a decoder configuration record of the file format and associate all other information in the decoder configuration record with all layers of the multi-layer video data in a track. File generation device 34 may additionally or alternatively store a layer count in the oinf box of the file format, wherein the layer count indicates a number of necessary layers of an operation point of the multi-layer video data.

The oinf box may be included in a media information box, and the oinf box may be included in a sample group-description box. The sample group-description box may be included in a sample table box, and the sample table box may be included in the media information box.

File generation device 34 may store representation format information and frame rate information in a decoder configuration record for each layer of the multi-layer video data. File generation device 34 may additionally or alternatively store parallelism information in the decoder configuration record for each layer of the multi-layer video data. File generation device 34 may not store an operation point index in a decoder configuration record of the file format. File generation device 34 may additionally or alternative store a list of operation point indices associate with a track of the multi-layer video data in a decoder configuration record of the file format.

Figure 8:
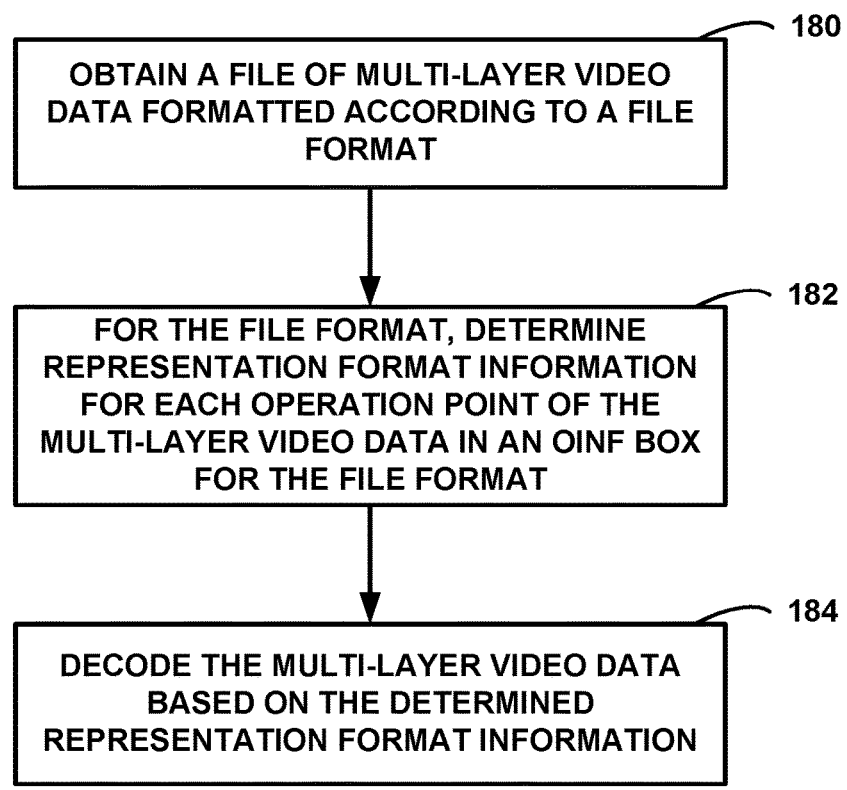
FIG. 8 is a flowchart illustrating an example operation of a file reading device in accordance with one or more techniques of this disclosure.

FIG. 8 is a flowchart illustrating an example operation of a file reading device, such as destination device 14, post-processing entity 27, or network entity 29. The operation of FIG. 8, along with operations illustrated in other flowcharts of this disclosure, are examples. Other example operations in accordance with the techniques of this disclosure may include more, fewer, or different actions.

In the example of FIG. 8, a file reading device obtains a file of multi-layer video data formatted according to a file format (180). The file reading device, for the file format, determines representation format information for each operation point of the multi-layer video data in an oinf box for the file format (182). The file reading device, possibly in conjunction with a video decoder such as video decoder 30, decodes the multi-layer video data based on the determined representation format information (184).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing multi-layer video data, the method comprising:
    obtaining multi-layer video data comprising more than one operating point;
    storing the multi-layer video data in a file format, wherein the file format includes an operating points information (oinf) sample group which identifies the operating points included in the multi-layer video data;
    storing representation format information for each operating point of the multi-layer video data in the oinf sample group, wherein the representation format information comprises one or more of a spatial resolution, a bit depth, or a color format; and
    generating a file of video data formatted according to the file format.

2. The method of claim 1, further comprising:
    storing bitrate information for each operating point of the multi-layer video data in the oinf sample group of the file format; and not signaling a bit rate sample group after a configuration sample group of the file format.

3. The method of claim 1, further comprising:
not storing profile, tier, and level (PTL) information, representation format information, and frame rate information in a decoder configuration record of the file format; and
associating all information in the decoder configuration record with all layers of the multi-layer video data in a track.

4. The method of claim 1, further comprising:
storing representation format information and frame rate information in a decoder configuration record for each layer of the multi-layer video data.

5. The method of claim 4, further comprising:
storing parallelism information in the decoder configuration record for each layer of the multi-layer video data.

6. The method of claim 1, further comprising:
not storing an operating point index in a decoder configuration record of the file format.

7. The method of claim 1, further comprising:
storing a list of operating point indices associated with a track of the multi-layer video data in a decoder configuration record of the file format.

8. The method of claim 1, further comprising:
storing a layer count in the oinf sample group of the file format, wherein the layer count indicates a number of necessary layers of an operating point of the multi-layer video data.

9. The method of claim 1, wherein the oinf sample group is included in a media information sample group.

10. The method of claim 9, wherein the oinf sample group is further included in sample group-description sample group, wherein the sample group description sample group is included in a sample table sample group, and wherein the sample table sample group is included in the media information sample group.

11. The method of claim 1, wherein each operating point of the multi-layer video data comprises, respectively, a bitstream created from another bitstream by operating of a sub-bitstream extraction process with the another bitstream.

12. A video device for processing multi-layer video data, the device comprising:
a data storage medium configured to store the multi-layer video data; and
one or more processors configured to:
obtain multi-layer video data comprising more than one operating point;
store the multi-layer video data in a file format, wherein the file format includes an operating points information (oinf) sample group which identifies the operating points included in the multi-layer video data;
store representation format information for each operating point of the multi-layer video data in the oinf sample group, wherein the representation format information comprises one or more of a spatial resolution, a bit depth, or a color format; and
generate a file of video data formatted according to the file format.

13. The device of claim 12, wherein the one or more processors are further configured to:
store bitrate information for each operating point of the multi-layer video data in the oinf sample group of the file format; and
not signal a bit rate sample group after a configuration sample group of the file format.

14. The device of claim 12, wherein the one or more processors are further configured to:
not store profile, tier, and level (PTL) information, representation format information, and frame rate information in a decoder configuration record of the file format; and
associate all information in the decoder configuration record with all layers of the multi-layer video data in a track.

15. The device of claim 12, wherein the one or more processors are further configured to:
store representation format information and frame rate information in a decoder configuration record for each layer of the multi-layer video data.

16. The device of claim 15, wherein the one or more processors are further configured to:
store parallelism information in the decoder configuration record for each layer of the multi-layer video data.

17. The device of claim 12, wherein the one or more processors are further configured to:
not store an operating point index in a decoder configuration record of the file format.

18. The device of claim 12, wherein the one or more processors are further configured to:
store a list of operating point indices associated with a track of the multi-layer video data in a decoder configuration record of the file format.

19. The device of claim 12, wherein the one or more processors are further configured to:
store a layer count in the oinf sample group of the file format, wherein the layer count indicates a number of necessary layers of an operating point of the multi-layer video data.

20. The device of claim 12, wherein the oinf sample group is included in a media information sample group.

21. The device of claim 20, wherein the oinf sample group is further included in sample group-description sample group, wherein the sample group-description sample group is included in a sample table sample group, and wherein the sample table sample group is included in the media information sample group.

22. The device of claim 12, wherein each operating point of the multi-layer video data comprises, respectively, a bitstream created from another bitstream by operating of a sub-bitstream extraction process with the another bitstream.

23. A video device for processing multi-layer video data, the device comprising:
means for obtaining multi-layer video data comprising more than one operating point;
means for storing the multi-layer video data in a file format, wherein the file format includes an operating points information (oinf) sample group which identifies the operating points included in the multi-layer video data;
means for storing representation format information for each operating point of the multi-layer video data in the oinf sample group, wherein the representation format information comprises one or more of a spatial resolution, a bit depth, or a color format; and
means for generating a file of video data formatted according to the file format.

24. The device of claim 23, wherein the oinf sample group is included in a media information sample group.

25. The device of claim 24, wherein the oinf sample group is further included in sample group-description sample group, wherein the sample group-description sample group is included in a sample table sample group, and wherein the sample table sample group is included in the media information sample group.

26. A non-transitory computer-readable storage medium storing instructions that when executed cause one or more processors to:
    obtain multi-layer video data comprising more than one operating point;
    store the multi-layer video data in a file format, wherein the file format includes an operating points information (oinf) sample group which identifies the operating points included in the multi-layer video data;
    store representation format information for each operating point of the multi-layer video data in the oinf sample group, wherein the representation format information comprises one or more of a spatial resolution, a bit depth, or a color format; and
    generate a file of video data formatted according to the file format.

27. The non-transitory computer-readable storage medium of claim 26, wherein the oinf sample group is included in a media information sample group.

28. The non-transitory computer-readable storage medium of claim 27, wherein the oinf sample group is further included in sample group-description sample group, wherein the sample group-description sample group is included in a sample table sample group, and wherein the sample table sample group is included in the media information sample group.

* * * * *